United States Patent
Dao

(10) Patent No.: US 10,362,507 B2
(45) Date of Patent: Jul. 23, 2019

(54) SYSTEMS AND METHOD FOR QUALITY OF SERVICE MONITORING, POLICY ENFORCEMENT, AND CHARGING IN A COMMUNICATIONS NETWORK

(71) Applicant: Ngoc Dung Dao, Ottawa (CA)

(72) Inventor: Ngoc Dung Dao, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 222 days.

(21) Appl. No.: 15/613,031

(22) Filed: Jun. 2, 2017

(65) Prior Publication Data

US 2017/0359749 A1  Dec. 14, 2017

Related U.S. Application Data

(60) Provisional application No. 62/348,719, filed on Jun. 10, 2016.

(51) Int. Cl.
| | |
|---|---|
| *H04W 28/02* | (2009.01) |
| *H04W 24/08* | (2009.01) |
| *H04L 12/853* | (2013.01) |
| *H04W 24/04* | (2009.01) |

(52) U.S. Cl.
CPC ..... *H04W 28/0268* (2013.01); *H04L 47/2416* (2013.01); *H04W 24/08* (2013.01); *H04W 24/04* (2013.01)

(58) Field of Classification Search
CPC .. H04L 47/2416; H04W 24/04; H04W 24/08; H04W 28/0268
See application file for complete search history.

(56) References Cited

U.S. PATENT DOCUMENTS

| | | | |
|---|---|---|---|
| 6,895,054 B2* | 5/2005 | Li | H04N 19/172 375/240.03 |
| 2003/0214928 A1* | 11/2003 | Chuah | H04L 43/00 370/336 |
| 2007/0115856 A1 | 5/2007 | Schelen et al. | |
| 2007/0115918 A1 | 5/2007 | Bodin et al. | |

(Continued)

FOREIGN PATENT DOCUMENTS

| | | |
|---|---|---|
| CN | 102858015 A | 1/2013 |
| EP | 2385721 A1 | 11/2011 |

(Continued)

OTHER PUBLICATIONS

InnovationQ_IP.com NPL search Feb. 22, 2019 (Year: 2019).*

(Continued)

*Primary Examiner* — Benjamin H Elliott, IV

(57) ABSTRACT

Methods for quality of service monitoring, policy enforcement, and charging in a communications network, are disclosed. The methods include mapping quality of service parameters to measured parameters of a real-time video or packet data unit flow. The mapping may be used to monitor bursty traffic to adhere to quality of service requirements, perform traffic shaping, and for use in reporting certain network events. The measured parameters of real-time packet data unit flow include a first bit rate measured over a short-term measurement window and a second bit rate measured over a long-term measurement window. The short-term and long-term measurement windows are differently sized.

25 Claims, 15 Drawing Sheets

(56) References Cited

U.S. PATENT DOCUMENTS

| | | | |
|---|---|---|---|
| 2012/0057544 A1* | 3/2012 | Xu | H04L 1/00 |
| | | | 370/329 |
| 2013/0021933 A1 | 1/2013 | Kovvali et al. | |
| 2017/0359749 A1* | 12/2017 | Dao | H04W 28/0268 |
| 2017/0373950 A1* | 12/2017 | Szilagyi | H04L 41/5035 |

FOREIGN PATENT DOCUMENTS

| | | | |
|---|---|---|---|
| WO | 2014014474 | A2 | 1/2014 |
| WO | 2015139726 | A1 | 9/2015 |

OTHER PUBLICATIONS

InnovationQ_IP.com Patent and PGPub search Feb. 22, 2019 (Year: 2019).*

International Search Report dated Jul. 6, 2017 for corresponding International Application No. PCT/CN2017/087417 filed Jun. 7, 2017.

3rd Generation Partnership Project, "Technical Specification Group Services and System Aspects; Study on Architecture for Next Generation System(Release 14)", 3 GPP TR 23.799 V0.4.0, Apr. 30, 2016.

"Policy and charging control architecture"; 3GPP TS 23.203 V13.7.0 (Mar. 2016).

"Study on Architecture for Next Generation System"; 3GPP TR 23.799 V0.4.0 (Apr. 2016).

"Update of Solution 2.1: QoS functions and distribution"; SA WG2 Meeting #115; S2-162817; May 23-27, 2016, Nanjing, China.

* cited by examiner

SYSTEMS AND METHOD FOR QUALITY OF SERVICE MONITORING, POLICY ENFORCEMENT, AND CHARGING IN A COMMUNICATIONS NETWORK

CROSS-REFERENCE TO RELATED APPLICATIONS

This application claims the benefit of priority to U.S. Provisional Patent Application No. 62/348,719 filed Jun. 10, 2016, the contents of which are incorporated herein by reference in their entirety.

FIELD OF THE INVENTION

The present invention pertains to the field of network communications, and in particular towards systems and methods for quality of service monitoring, policy enforcement, and charging in a communications network.

BACKGROUND

A communications network may comprise network nodes used for the exchange and delivery of data therebetween, and to User Equipment (UEs) communicatively coupled thereto. The data, for example, may comprise video data, that can account for over 50% of mobile network traffic in certain wireless communications networks. In some cases, Mobile Network Operators (MNOs) which access the communications network infrastructure to provide services to their end-users, may wish to promote their own video services to compete with Over-the-top (OTT) content. In the future, the scope of video services can be enlarged to include higher definition video services, including HD/4K/8K/3D, for real-time services, including virtual-reality applications. This may result in the provision of increased video services in the future, which would require a larger bandwidth (e.g. up to 250 Mbit/s) with a shorter delay time (e.g. from 150 ms with current video telephony to 10 ms). Further examples may be found in document SA1 TR22.890 titled "Feasibility Study on New Services and Markets Technology Enablers; Stage 1", published March 2016. Accordingly, systems and methods which can provide data content, such as video content, over a communications network while meeting these improved service requirements, are desired.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods to monitor Quality of Service (QoS) of real-time video flows in a communications network.

In accordance with embodiments of the present invention, there is provided a method, for execution at a policy enforcement and reporting function in a network. The method comprises receiving traffic parameters associated with a packet data unit (PDU) data flow carrying real-time traffic, and transmitting signaling comprising a traffic shaping policy for enforcement at a user plane function in the network. The traffic parameters are received from a traffic monitor. The traffic parameters are representative of measurements taken during a short-term measurement window and measurements taken during a long-term measurement window. The short-term measurement window and the long-term measurement window are differently sized. The traffic shaping policy is associated with the PDU data flow and is in accordance with the traffic parameters associated with the short-term measurement window and the long-term measurement window.

In accordance with embodiments of the present invention, there is also provided a network function comprising a network interface for receiving and transmitting data to a network, a processor, and a non-transitory memory storing instructions that when executed by the processor configure the network function to receive traffic parameters associated with a PDU data flow carrying real-time traffic, and transmit signaling comprising a traffic shaping policy for enforcement at a user plane function in the network. The traffic parameters are received from a traffic monitor. The traffic parameters are representative of measurements taken during a short-term measurement window and measurements taken during a long-term measurement window. The short-term measurement window and the long-term measurement window are differently sized. The traffic shaping policy is associated with the PDU data flow, and is in accordance with the traffic parameters associated with the short-term measurement window and the long-term measurement window.

In accordance with embodiments of the present invention, there is also provided a user equipment comprising a radio access network interface for receiving and transmitting data to a network, a processor, and a non-transitory memory storing instructions that when executed by the processor configure the user equipment to receive traffic parameters associated with a PDU data flow carrying real-time traffic, change encoding parameters associated with the PDU data flow in accordance with the traffic parameters associated with a short-term measurement window and a long-term measurement window, and transmit the PDUs in the PDU data flow encoded in accordance with the changed encoding parameters. The traffic parameters are received from a traffic monitor. The traffic parameters representative of measurements taken during the short-term measurement window and measurements taken during the long-term measurement window. The short-term measurement window and the long-term measurement window are differently sized.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
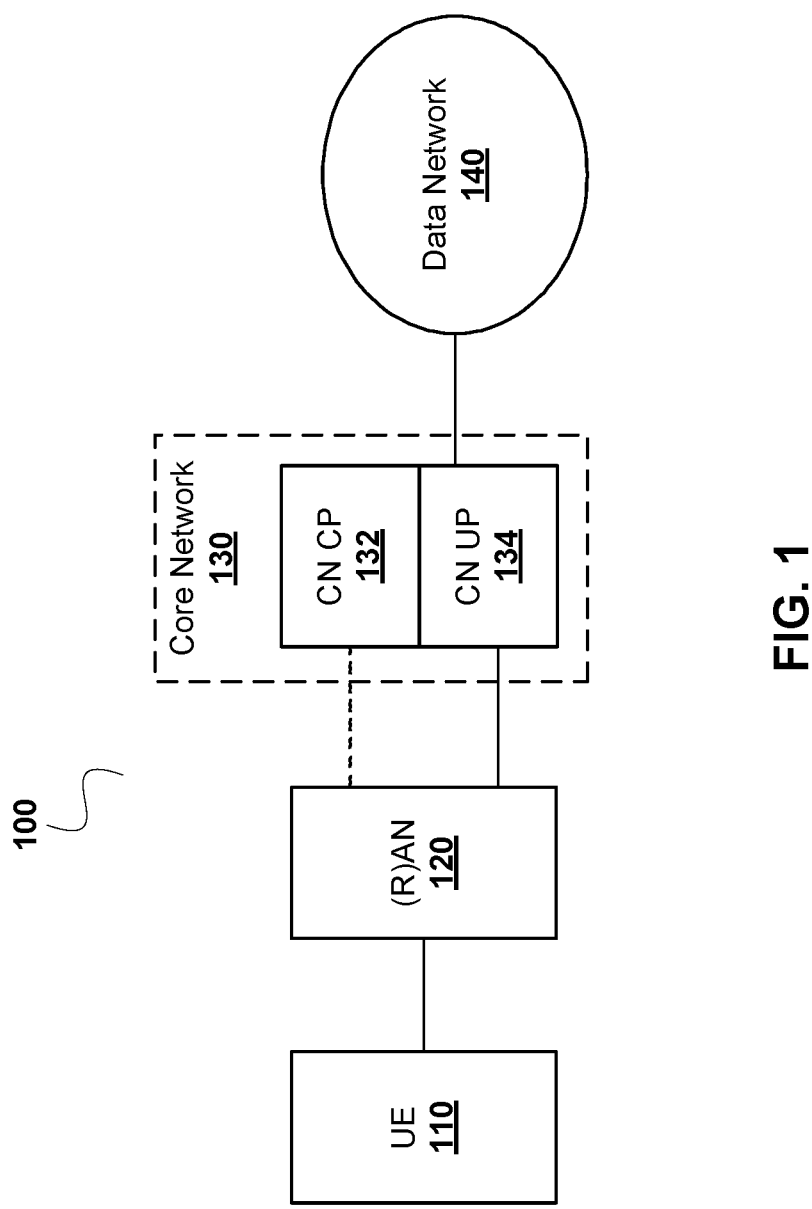
FIG. 1 is a component diagram illustrating an example of a communications network architecture, such as a Third Generation Partnership Project (3GPP) network architecture.

Methods for quality of service monitoring, policy enforcement, and charging in a communications network, are disclosed. The methods include mapping quality of service parameters to parameters of a real-time video flow. The mapping may be used to monitor bursty traffic to adhere to quality of service requirements, perform traffic shaping, and for use in reporting certain network events.

As will be understood by those skilled in the art, network resources such as bandwidth are typically fixed over short durations of time. Although capacity can be added or removed from a network, it is typically not a process that is done over short time frames. As such, when accommodating different traffic flows, a network operator has an incentive to admit and manage the traffic of sessions in a way that allows for a maximization of the available resources. Because there may be Quality of Service (QoS) and Quality of Experience (QoE) commitments made to customers, simply admitting users without limit is not an acceptable solution. To allow for the admission of as many sessions as possible, while still accommodating the QoS/QoE guarantees, network operators will typically base their planning on expected traffic patterns. The amount of bandwidth that can be allocated to a particular PDU data flow is a function of the available network resources which may be impacted by the other traffic on the network. As noted elsewhere, first and second windows (e.g. short-term and long-term windows) can be used to get different information about the resource requirements of a PDU data flow. If a QoS/QoE guarantee has been made, it is likely that a minimum bandwidth has been established, and it may be desirable to ensure that the network ensures that the data flow is always provided at least this minimum resource reservation (which may be associated with a traffic parameter or characteristic measured over one of the windows, e.g. the long term window). Conversely, the data flow may be restricted so that it does not consume more bandwidth than a maximum allowable threshold (e.g. the average data rate in a short term window may be restricted to ensure that is does not exceed the threshold).

Various techniques, including traffic shaping may be applied to ensure that the traffic characteristics fall within the network resource availability. Shaping traffic is a known technique in which the demand for network resources is conformed to a particular pattern. The pattern may be determined based on commitments to the customer or service provider associated with the flow, the available resources and other bandwidth demands that are not associated with the PDU data flow. Changing the shape of a traffic flow may include constraining the traffic flow by any or all of increasing a packet drop rate, delaying the transmission of packets to smooth out a demand, buffering traffic for later in-order transmission, and other such techniques. By changing the shape of traffic demand, QoS and QoE guarantees can be met, but instantaneous traffic demands can be handled in a manner that does not cause problems for other flows. The design of a traffic shaping profile, can be done at a network function other than the function at which the profile is applied (e.g. a User Plane (UP) gateway may apply a function provided to it by a control plane function, or by another function such as a Policy Charging and Enforcement Function (PCEF). A traffic shaping policy may be applicable to all traffic associated with a particular traffic source, with a particular network function, with a particular network service, or a particular application. In some embodiments, the traffic shaping policy can be applied based on an identification of a packet that is determined by deep packet inspections, while in other embodiments the identification of a packet may be determined through the detection of a tag in a packet header.

Advancements and increased usage of video content delivery in a communications network may require new methods to provide and monitor Quality of Service (QoS) of real-time video flows, to ensure minimum delivery standards are adhered to when provided to an Electronic Device such as a User Equipment (UE). Additionally, mechanisms may be needed to monitor and enforce traffic shaping for bursty traffic, which may be used in turn for charging functions, for example, by a Network Operator in order to charge or bill its end-users accessing the communications network. Accordingly, embodiments of the present invention are directed towards systems and methods for QoS monitoring, policy enforcement, and charging in a communications network, which may be applied for example during the delivery of video content to an Electronic Device such as a UE over the communications network. Those skilled in the art will appreciate that the use of the term Electronic Device is intended to broadly cover UEs, other types of devices that connect to the mobile network whether they do or do not fall under the definition of the term UE, as well as infrastructure elements such as base stations as well as network functions.

Embodiments of the present invention provide systems and methods which provide a mapping between system QoS parameters and application parameters of real-time video flows. For example, the application (UE or Application Function) may provide parameters "short-time maximum peak bit rate" and "long-time minimum average bit rate", and map these parameters to "Maximum bit rate" and "Minimum bit rate" parameters, respectively. Within this disclosure, the "short-time maximum peak bit rate" and "long-time minimum average bit rate" are referred to as the "short-term maximum peak bit rate" and "long-term minimum average bit rate", respectively. The input parameter "Requested Measurement Window Size" is used to measure the long-term average bit rate (in order of seconds). The QoS Control Function of CP CN will derive another internal parameter "Short-Term Measurement Window Size" from "Delay Requirements" to monitor the short-term peak bit rate. This method uses the same number of input parameters from applications as defined in "Solution 2.1: QoS functions and distribution" (in TR 23.799 Version V0.4.0 published in April 2016, and other versions such as V2.0.0 published in November 2016) and replaces one input parameter by two new internal parameters. The following updates can be made to the existing "Solution 2.1: QoS functions and distribution" for real-time video services: Explicit definitions of the "Maximum Bit rate" and "Minimum Bit rate" application input parameters as "short-term maximum peak rate" and "long-term minimum average rate", respectively; Explicit definition of the "Requested Measurement Window Size" application input parameter to monitor the long-term average bit rate in order to meet a "Minimum Bit rate" requirement; and New definitions of internal parameters "Short-Term Measurement Window Size" and "Long-Term Measurement Window Size" to allow for the monitoring of the short-term peak bit rate (with respect to the Minimum Bit rate QoS parameter) and the long-term average rate (with respect to the Minimum Bit rate QoS parameter) of real-time video flows for QoS policy enforcement and QoS monitoring purposes. These two parameters are derived by the "Operator Control" function in the Control Plane (CP) of the Core Network (CN) from application input parameters "Delay requirements" and "Requested Measurement Window Size". An "Operator Control" function distributes these internal parameters to the RAN and UP functions for QoS policy enforcement and monitoring. The mapping and explicit definitions may help meet a Radio Access Network (RAN)-CN functional split (which will be shown below), and access agnostic core requirements. The mapping and explicit definitions may also be applied to similar parameters "maximum bit rate" and "guaranteed bit rate" of the other QoS provisioning solutions.

Persons skilled in the art will appreciate that the "short-term maximum peak rate" and "long-term minimum average rate" can be mapped to QoS parameters "Maximum Flow Bit Rate (MFBR)" and Guaranteed Flow Bit Rate (GFBR), respectively, as defined in TS 23.501 Version V0.4.0 Published in April 2017 and other versions such as Version V0.5.0 published May 2017.

In certain embodiments, the minimum bit rate is monitored to determine whether the Quality of Experience (QoE) of a service can be satisfied. In the case of real-time video services, some internal QoS parameters for QoS control and monitoring can be derived from application requirement inputs via QoS operator control functions.

Further, embodiments also provide methods for monitoring bursty traffic, traffic shaping, and reporting of events. These methods, for example, may be applied to communications standards such as the Third Generation Partnership Project (3GPP) SA WG2 working group for QoS parameters, and the 3GPP SA4 for working group Policy and Charging. These methods can be applied to the Third Generation (3G), Fourth Generation (4G), and future Fifth Generation (5G) Core Networks.

FIG. 1 is a component diagram illustrating an example of a communications network architecture 100, such as a 3GPP network architecture. The communications network architecture 100 comprises an Electronic Device (ED) 110, an Access Network (AN) 120, a Core Network (CN) 130 and a Data Network (DN) 140. An ED 110 may be a UE or any other Electronic Device that connects to an AN 120. An example of an AN 120 is a Radio Access Network (RAN). The term (R)AN may sometimes be used in this description to designate that either an AN and/or a RAN may apply. The CN 130 includes a Control Plane (CP) 132 and a User Plane (UP) 134. The ED 110 communicates with a node in the DN 140 (typically to obtain a service) via connections through a node in the (R)AN 120 and then through the CN 130. Message Packet Data Units (PDUs) between the ED 110 and a node in the DN 140 are transmitted through the (R)AN 120 and the CN 130. A DN 140 may be a public network operator, a private data network, an intra-operator data network, or any other type of data network. It should also be understood that in some embodiments the DN 140 can be the Internet.

In an Uplink (UL) direction, UP PDUs addressed to a server or node in the DN 140 are transmitted from the ED 110 to a node within the (R)AN 120 via a communication link. The (R)AN 120 node then forwards the received UP PDUs to a node within the CN 130. In some embodiments, the node within the CN 130 is a gateway, such as a packet gateway, that forwards the UP PDUs towards the node in DN 140 to which the PDU is addressed. In a Downlink (DL) direction, DL PDUs are transmitted from a node in the DN 140 to a node in the CN 130 that then forwards the DL PDUs to a node in the (R)AN 120 that then forwards the DL PDUs to the ED 110. CP functions within the CN 130 (often implemented as network functions instantiated upon a computing resource within the CN 130) configure UP functions within the CN 130 to configure how traffic is handled. In some embodiments, this can be done on a per session or per flow basis. One or more UP function per session may be activated and configured by a network function within the CP 132 for a given UP 134 scenario.

The connections between the components of the communications network architecture 100 may be any suitable communication channel, including a logical interface such as a reference point. It will be understood that the nature of the connection between the ED 110 and a node in (R)AN 120 may depend on the type of Radio Access Technology (RAT) (or simply the access technology) used in the (R)AN 120.

Figure 2:
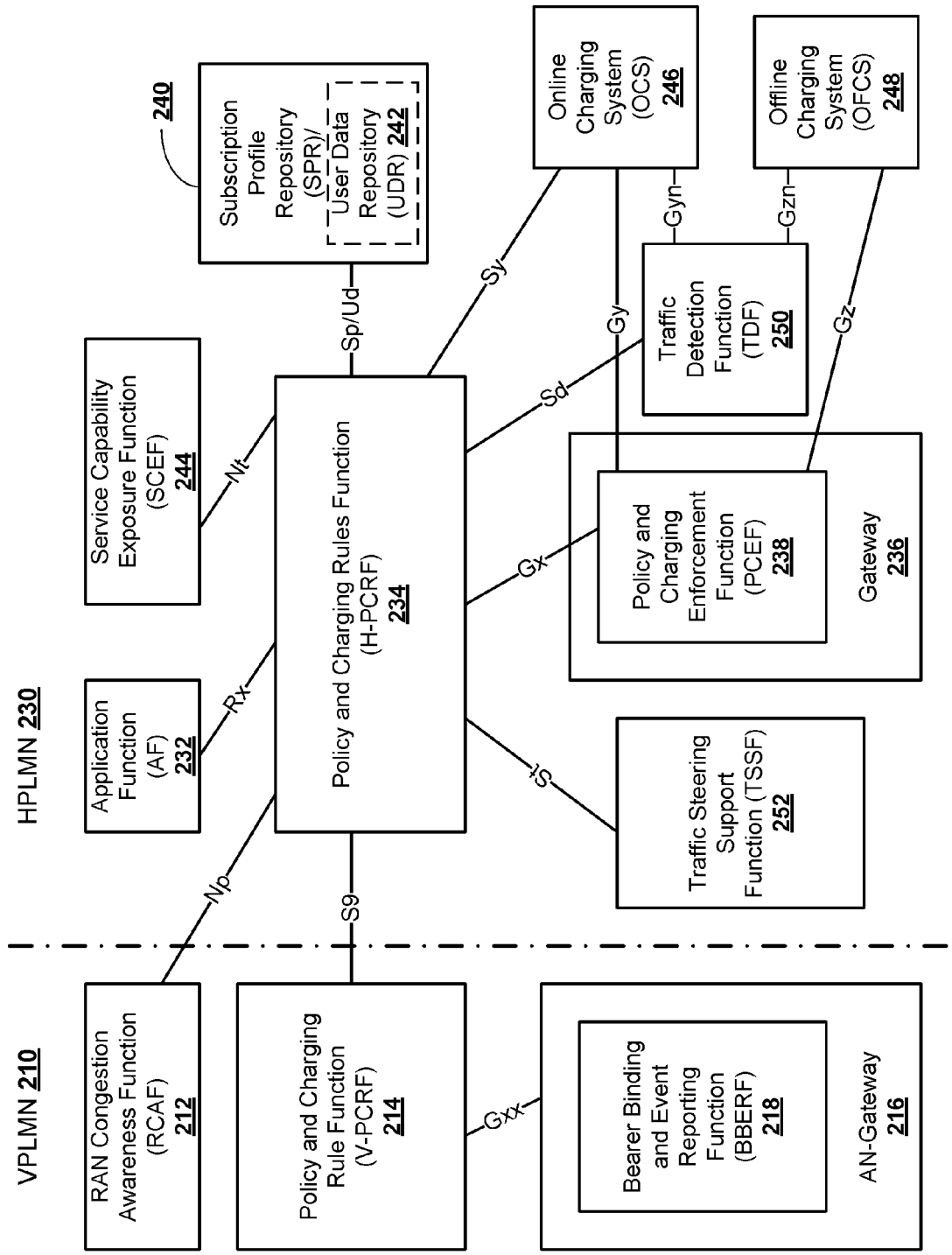
FIG. 2 is a functional schematic of a Policy and Charging Rule (PCR) architecture deployed over a communications network, according to an embodiment.

FIG. 2 is a functional schematic of a Policy and Charging Rule (PCR) architecture 200 deployed over a communications network, such as a 3GPP network, according to an embodiment of the invention. It is understood that while FIG. 2 pertains to a Fourth generation (4G) network, changes and modifications applied to certain network function elements in FIG. 2, in accordance with embodiments of the present invention, may also be applied to similar network function elements in 5G networks. In some embodiments, the schematic in FIG. 2 may correspond to that shown in document 3GPP TS 23.203, titled "Policy and charging control architecture", Version 13.7.0, published March 2016. As shown, the PCR architecture 200 is divided into a Visiting Public Land Mobile Network (VPLMN) 210 and a Home Public Land Mobile Network (HPLMN) 230, each of which comprise additional functional elements as indicated in FIG. 2.

The HPLMN 230 includes an Application Function (AF) 232 which sends service requests and CODEC (Coding-Decoding, or Compression-Decompression) parameters to a Policy and Charging Rules function (H-PCRF) 234. The H-PCRF 234 may also receive service capability information from the Service Capability Exposure Function (SCEF) 244. The User Data Repository (UDR) 242 stores data and information from the H-PCRF 234, which may be later used to determine charges for the usage and delivery of data over the network for a particular user/customer. The UDR 242 may be part of a data repository 240 that also includes a Subscription Profile Repository (SPR). The H-PCRF 234 may also communicate with an Online Charging System (OCS) 246, a Traffic Detection Function (TDF) 250 and a Traffic Steering Support Function (TSSF) 252. The H-PCRF 234 may also receive information from a RAN Congestion Awareness Function (RCAF) 212 and a VPLMN Policy and Charging Rules Function (V-PCRF) 214 in the VPLMN 210. The V-PCRF 214 may request or receive information from a Bearer Binding and Event Reporting Function (BBERF) 218 in an AN-Gateway 216 of the VPLMN 210.

The Policy and Charging Enforcement Function (PCEF) 238 may be deployed on a gateway node 236 of the network 230, and used to monitor traffic through the node 236, and then shape the traffic accordingly. For example, it may allow or block certain data streams based on the allowed or maximum bit rate for a certain user/customer. Accordingly, the AF 232, H-PCRF 234, UDR 242, and PCEF 236 are cooperatively functional through the exchange of various parameters, signaling messages, and operations, in order to provide video content to an ED 110 such as a UE over the communications network, while also performing QoS monitoring, policy enforcement and charging as will be described in further detail below.

Figure 3:
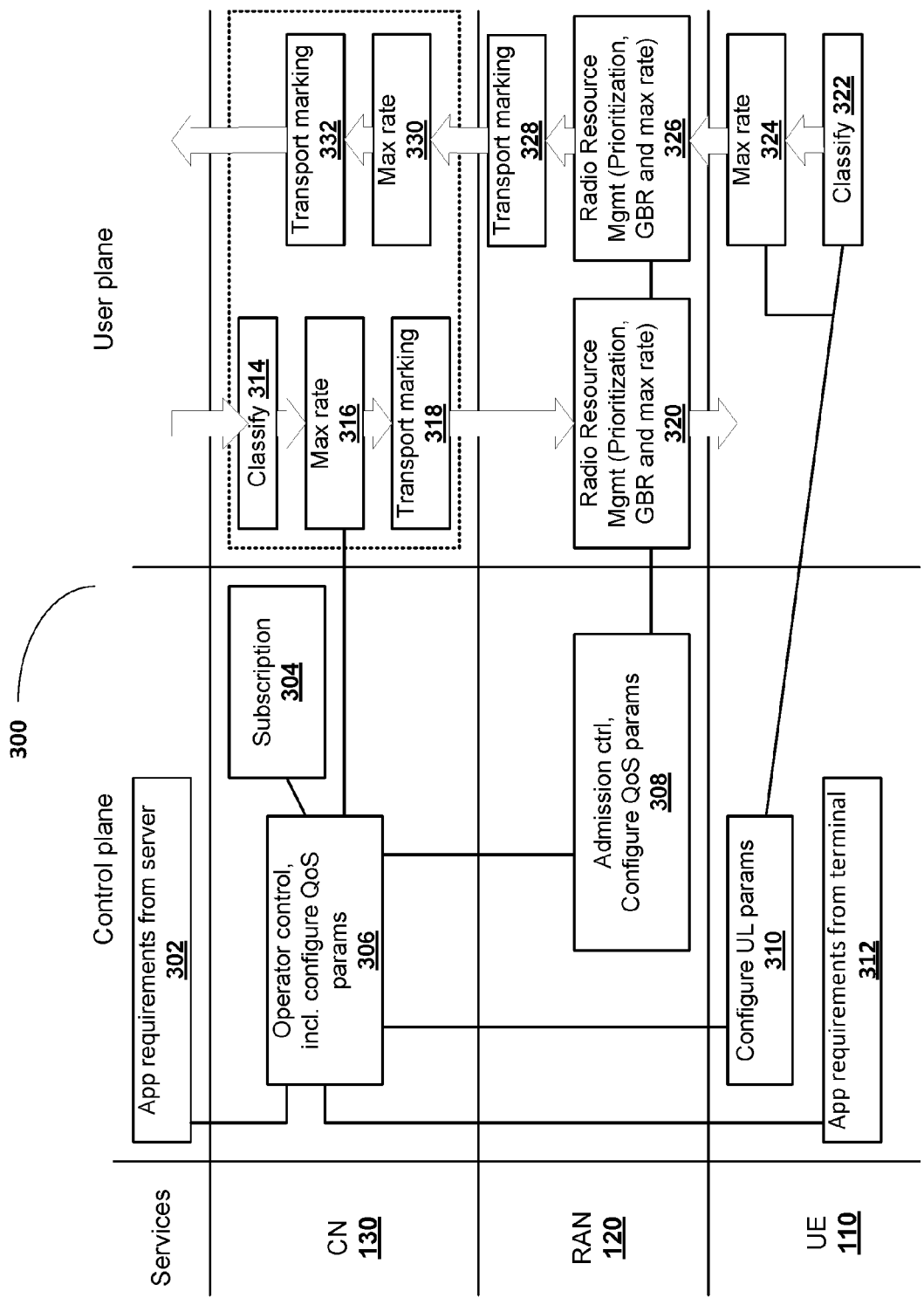
FIG. 3 is a functional diagram illustrating data content delivery performed over a communications network, according to an embodiment.

FIG. 3 is a functional diagram illustrating data content delivery performed over a communications network 300, according to an embodiment. The communications network 300 comprises a Core Network (CN) 130, a Radio Access Network (RAN) 120, and a UE (i.e. ED 110) communicatively coupled to the RAN 120. The functions of the communications network are divided between the Control Plane and User Plane, as understood by those skilled in the art. The CN 130 comprises an Operator control function 306 (and may further comprise network functions that can configure QoS parameters) and a Subscription repository 304. The Operator control function 306 may receive application requirements 302 from an application function or server at the service layer (SL), receive subscription information from the Subscription repository 304, and receive application requirements from the terminal ED 110 (e.g. UE). The Operator control function 306 may then process this input and determine the Maximum Bit Rate (MBR) and other QoS parameters for a data session between the UE and Application server. The Operator control function 306 may also send the maximum bit rate that will be allowed in the session (sometimes referred to herein as the "Max rate") and other QoS parameters to the CN UP 134, an Admission control module 308 in the RAN 120 and a Configuration module 310 in the UE. The Admission control module 308 may configure the QoS parameters in the UP of the RAN 120 and the Configuration module 310 may configure UL parameters in the UP of the UE.

The transmissions shown in the User Plane between the CN 130 and UE (i.e. ED 110) include a Downlink (DL) transmission (left side), and Uplink (UL) transmission (right side). In the CN UP 134, the DL transmission comprises receiving session packets from the application server at the SL, classifying 314 the packets (e.g. determining in which prioritization buffer to place the packets), mapping the packets to QoS flows in compliance with the Max rate 316, and transport marking the packets 318 with the QoS flows before transmitting the packets to the RAN 120. A first Radio Resource Management module 320 in the RAN 120 receives the packets, prioritizes the packets and sends them to the UE based on the Guaranteed Bit Rate (GBR) and the Max rate. In the UE UP, the UL transmission comprises classifying 322 session packets, mapping the packets to QoS flows in compliance with the Max rate 316, and transmitting the packets to the RAN 120 pursuant to the priority classification and marked QoS flow. A second Radio Resource Management module 326 in the RAN 120 receives the packets from the UE and sends them to be transport marked 328 before being transmitted to the CN 130. In an embodiment, the first and second Radio Resource Management modules 320, 326 may be different instantiations of the same Radio Resource Management module function. A network function at the CN UP 134 receives the session packets, maps the packets to a QoS flow in compliance with the Max rate 330, performs transport marking 332 to the packets, and transmits the packets to the application server at the service layer (SL) pursuant to markings associated with the marked QoS flow. It should be understood that while the communication link between the UE/ED 110 and the (R)AN 120, the communication link between the (R)AN 120 and the CN UP 134, and the communication link between the CN UP 134 and the application in the SL, are all subject to the same QoS flow requirements, they may experience a different QoS/QoE that is higher than the minimum requirement. In some embodiments of the present invention, there are provided methods of monitoring that the QoS minimum requirements are being met, enforcing policy based on the QoS, and storing network event information for use in service charging. Under certain standards or configurations (for example, as shown in 3GPP TR 23.799 V0.4.0, "Study on Architecture for Next Generation System", April 2016), the parameters and settings of the various functions shown in FIG. 3 have certain limitations or requirements in order to adhere to a certain QoS while transmitting data. For example, a maximum bit rate per service data flow (SDF) (e.g., the Max bit rate that the service is expected to deliver), a minimum bit rate per SDF (e.g., the bit rate that is required for the service to be delivered with sufficient QoE), delay requirements, and a requested Measurement Window Size (which indicates the condition when observing service behaviour to help fulfil service requirements).

In some embodiments, the architecture shown in FIG. 3 may be described as a QoS functional split between the UE (ED 110), AN 120, CN 130 and SL (e.g. DN 140) as shown in Table 1 below:

TABLE 1

QoS functional split between UE, AN, CN and SL

| Function | Distribution | Comment |
|---|---|---|
| Subscription 304 (incl. Default QoS Profile) | CN | |
| QoS Operator control 306 | CN | |
| Admission control 308 | AN | Admission to AN resources |
| Configuration of QoS parameters 306, 308, 310 | UE, AN, CN | |
| Application requirements input 302, 312 | From CN/SL to CN From UE/SL to CN From UE/SL to CN/SL | The application requirements input may be sent from either the server or the client. |
| Classification: 314, 322 | CN (DL), UE (UL) | Provides classification of packets for QoS purposes |
| Max rate control 316, 320, 324, 326, 330 | CN (DL, UL) AN (DL, UL) UE (UL) | |
| Transport marking 318, 328, 332 | AN (UL), CN (UL, DL) | |
| Resource Mgmt 320, 326 | AN | Packet scheduling with regards to resource utilization and availability (RRM) Resource mgmt is also performed in the transport domain (not shown) |

The functions referred to in the above table may be further described as follows:

Subscription 304 (including Default QoS Profile): The subscription 304 includes information about which QoS parameters are included in the subscription terms. The subscription QoS is an input for the network when authorizing the QoS for a PDU session and a non-Service-specific PDU flow in the QoS Operator control function 306.

QoS Operator control 306: With inputs from subscriptions 304, operator policies and application requirements input 302 from the service layer, the QoS parameters for PDU sessions and PDU flows are authorized in the QoS Operator control function 306. The QoS Operator control function 306 is also responsible for distributing the authorized QoS parameters in the network. In the case of PDU connectivity services provided in network sharing and/or roaming access, the QoS Operator Control function 306 may limit the QoS offered by the network providing the access.

Admission control 308 (AN): The admission control function 308 controls which PDU flows are to be admitted in the access network when the resources are scarce based on the QoS parameters applied for the session and flows. The admission control function 308 may also sacrifice already admitted flows to allow higher priority flows.

Configuration of QoS parameters 306, 308, 310: Each network element in the end-to-end solution is configured with the expected behaviour with respect to QoS, including how the QoS parameters received from the QoS Operator control function 306 may be handled and applied to the PDUs.

Application requirements input 302, 312: The network may receive application requirements input from the service layer (including the application server 302 and the UE/ED 110 terminal 312. The application requirements input may include the service behaviour and service requirements of Service Data Flows (SDF) transmitted through the network. The application requirements input 302, 312 is used by the QoS Operator control function 306 when authorizing the QoS parameters for PDU session and PDU flows.

Classification 314, 322: Indicates to which SDF flow each packet belongs. The classification 314, 322 is used to select which authorized QoS parameters to apply to each PDU in the CN-UP, AN-UP and UE-UP. Deducible SDFs may be classified based on Traffic Flow Template (TFT) filters in the DL and UL. Non-deducible SDFs may be classified in the DL based on packet inspection. UE reflective QoS according to TS 24.139, and packet inspection in CN-UP, may be used for the classification of non-deducible Internet Protocol (IP) flows in the UL.

Max rate control 316, 320, 324, 326, 330: The Max rate control function 316, 320, 324, 326, 330 ensures that the maximum bit rate in the Authorized QoS parameters is maintained.

Transport marking 318, 328, 332: The transport marking function 318, 328, 332 indicates the expected treatment in Internet Protocol (IP) networks with a stateless QoS mechanism, for example routers between the network elements.

Resource Management 320, 326: The resource management (mgmt.) function 320, 326 is responsible for how the resources are distributed in the access network based on the Authorized QoS parameters from the QoS Operator control function 306 and the monitoring of the fulfillment of the QoS targets. The resource management function 320, 326 can be different in 3GPP and non-3GPP ANs with regards to the possibilities to control resource utilization and availability. Resource management 320, 326 is also performed in the transport network.

One problem with the configuration shown in FIG. 3, is that when transmitting real-time video (for example, involving intra coded frames or I-frames), the peak bit rate can vary largely, for example by 10 times the average bit rate of delivery. This variance can drastically distort transmission and traffic management over the network, and cause a great impact on the QoE for transmissions over the network. Illustrations of this problem can be found in document 3GPP TR 26.924 V13, titled "Multimedia telephony over IP Multimedia Subsystem (IMS); Study on improved end-to-end Quality of Service (QoS) handling for Multimedia Telephony Service for IMS (MTSI)", published Dec. 13 2015, for example. When applied to projected real-time service requirements which have an average 250 Mbit/s bit rate, the peak bit rate may be as high as 2.5 Gbit/s.

Accordingly, knowledge of the peak bit rate, and average bit rate associated with the delivery of certain data content, can help a Mobile Network Operator (MNO) determine whether to admit, and how to deliver, certain video flow requests to more efficiently manage network traffic. Unfortunately, current communication system implementations do not provide any mechanisms for measuring parameters such as peak bit rate and average bit rate simultaneously, for example in 5G networks, and for mapping these parameters to Long Term Evolution (LTE) parameters (such as for CODEC, MBR/GBR, etc.) and TS 32.299, titled "Telecommunication management; Charging management; Diameter charging applications", Version 13.4.0 published in March 2016 or other versions such as Version 14.3.0 published in March 2017 (which can be retrieved from http://www.3gpp.org/DynaReport/32299.htm) to be applied towards functions such as QoS management, traffic shaping, policy enforcement, and charging.

The bit rate variation of real-time video flows has been studied in 3GPP TR 26.924, titled "Multimedia telephone over IP Multimedia Subsystem (IMS); Study on improved end-to-end Quality of Service (QoS) handling for Multimedia Telephony Service for IMS (MTSI)", Release 13, published December 2015. Depending on the measurement window size (i.e. the packet delay requirement), the peak-to-average bit rate ratio can significantly vary. The peak rate happens when transmitting intra-coded video frames (I-frame). For critical communications, the peak-to-average rate ratio could be as high as 9.8. For conversational services (end-to-end packet delay budget of 170 ms), the peak-to-average rate ratio could be 2.8.

Figure 4:
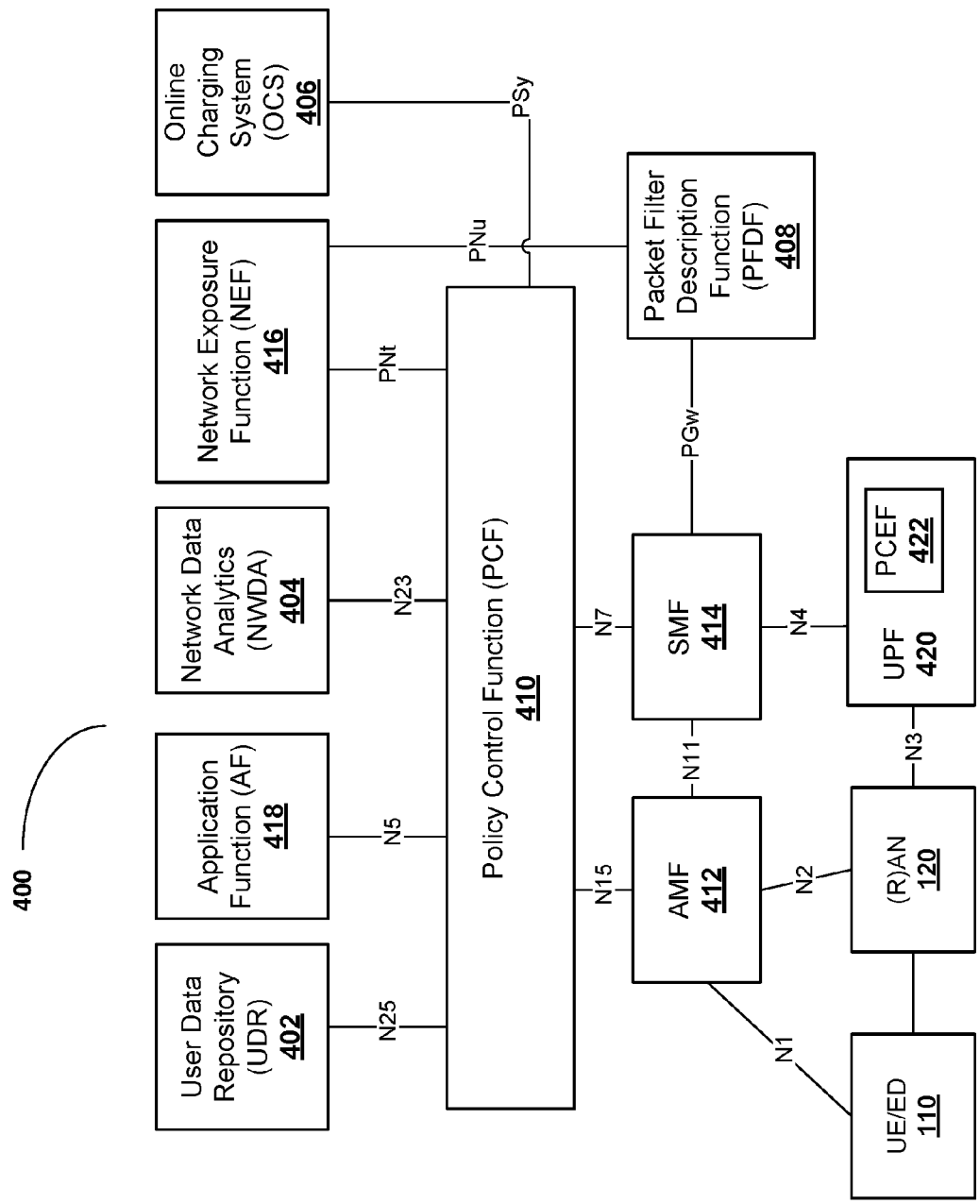
FIG. 4 is a component diagram illustrating an example of a Fifth Generation (5G) policy framework architecture, in accordance with embodiments of the present invention.

FIG. 4 is a component diagram illustrating an example of a 5G policy framework architecture 400, in accordance with embodiments of the present invention. Most of the network functions shown are located in the CN CP 132. These include the User Data Repository (UDR) 402, the Network Data Analytics (NWDA) 404, the Online Charging System (OCS) 406, the Packet Filter Description Function (PFDF) 408, the Policy Control Function (PCF) 410, the Access and Mobility management Function (AMF) 412 and the Session Management Function (SMF) 414. The Network Exposure Function (NEF) 416 may be located on the edge of the CN CP 132. The Application Function (AF) 418 may be located in the DN 140. The User Plane Function (UPF) 420 may be located in the CN UP 134 and may comprise a Policy and Charging Enforcement Function (PCEF) 422. The PCEF 422 may be controlled by the SMF 414 and may produce event based QoS and/or QoE reports. In some embodiment, the PCEF 422 (or portions of the function) may be co-located in the PCF 410. In a further embodiment the PCEF 422 may be instantiated at the same location as the PCF 410 and communicating with the UPF 420. The reports may be stored (e.g., recorded) at one or more of the UDR 402, PCF 410, OCS 406 and/or an Unstructured Data Storage Function (not shown). The OCS 406 or another charging system may access the reports for billing purposes.

It should be understood that the 5G network architecture can be represented in two ways. The architecture shown in FIG. 4 is a "reference point representation", and focuses on the interactions between pairs of network functions described by point-to-point reference points (e.g. N7) between any two network functions (e.g. PCF 410 and SMF 414) when some interaction exists between these two network functions. Another architecture type is a "service-based representation", where network functions (e.g. AMF 412) within the CP enable other authorized network functions to access their services. This representation may also include point-to-point reference points.

A N1 reference point resides between the UE/ED 110 and the AMF 412. A N2 reference point resides between the (R)AN 120 and the AMF 412. A N3 reference point resides between the (R)AN 120 and the UPF 420. A N11 reference point resides between the AMF 412 and the SMF 414.

A N5 reference point resides between the AF 418 and the PCF 410. The N5 reference point enables transport of application level session information from the AF 418 to the PCF 410. The N5 reference point enables the AF 418 to receive information about PDU session events from the PCF 410.

A N7 reference point resides between the SMF 414 and the PCF 410. The N7 reference point enables the PCF 410 to have dynamic policy and charging control at the SMF 414. The N7 reference point enables the signaling of policy and charging decision and it supports the establishment of a PDU Connectivity Access Network (PDU-CAN) session by the SMF 414, a request for a policy and charging control decision from the SMF 414 to the PCF 410, the provision of a policy and charging control decision from the PCF 410 to the SMF 414, the delivery of network events and PDU-CAN session parameters from the SMF 414 to the PCF 410, and the termination of the PDU-CAN session by the SMF 414 or the PCF 410.

A N15 reference point resides between the AMF 412 and the PCF 410. The N15 reference point enables the PCF 410 to provide Access and Mobility Management related policies to the AMF 412. The N15 reference point supports the handling of UE Context Establishment requests sent by the AMF 412 to the PCF 410 as part of UE Registration procedure(s), the provision of access and mobility management decisions from the PCF 410 to the AMF 412, the delivery of network events from the AMF 412 to the PCF 410, and the handling of UE Context Termination requests sent by the AMF 412 to the PCF 410 as part of a UE De-Registration procedure.

A N24 reference point resides between a PCF 410 in the HPLMN (H-PCF) and a PCF 410 in the VPLMN (V-PCF). In a roaming scenario, the N24 reference point enables the H-PCF to provision mobility policy rules to the V-PCF in the VPLMN, handle UE Context Establishment requests sent by the V-PCF as part of the UE Registration procedure(s), receive network event notifications from the V-PCF, and handle UE Context Termination requests sent by V-PCF as part of the UE De-Registration procedure.

A N25 reference point resides between the UDR 402 and the PCF 410, acting as an Application Front End in a layered architecture as defined in TS 23.335, Version V14.0.0 published in March 2017, on User Data Convergence. The N25 reference point enables the PCF 410 to access policy control related subscription data stored in the UDR 402. The N25 interface supports requests for policy control related subscription information from the UDR 402, provisioning of policy control related information to the UDR 402, and notifications from the UDR 402 regarding changes in the subscription information.

A N23 reference point resides between the NWDA 404 and the PCF 410. The N23 reference point, enables the PCF 410 to subscribe to, and be notified on, network status analytics (e.g. congestion information for a specific slice).

A PNt reference point resides between the NEF and the PCF 410. A PNu reference point resides between the NEF 416 and the PFDF 408. A PSy reference point resides between the OCS 406 and the PCF 410. A PGw reference point resides between the SMF 414 and the PFDF 408. A reference point resides (not shown) between the AF 418 and the NEF 416.

As will be described in further detail below, embodiments of the present invention may be applied to the system architecture illustrated in FIG. 4. It should be understood that while the 5G system architecture in FIG. 4 is for non-roaming scenarios, the embodiments of the present invention may similarly be applied to 5G system architectures for roaming scenarios.

Figure 5:
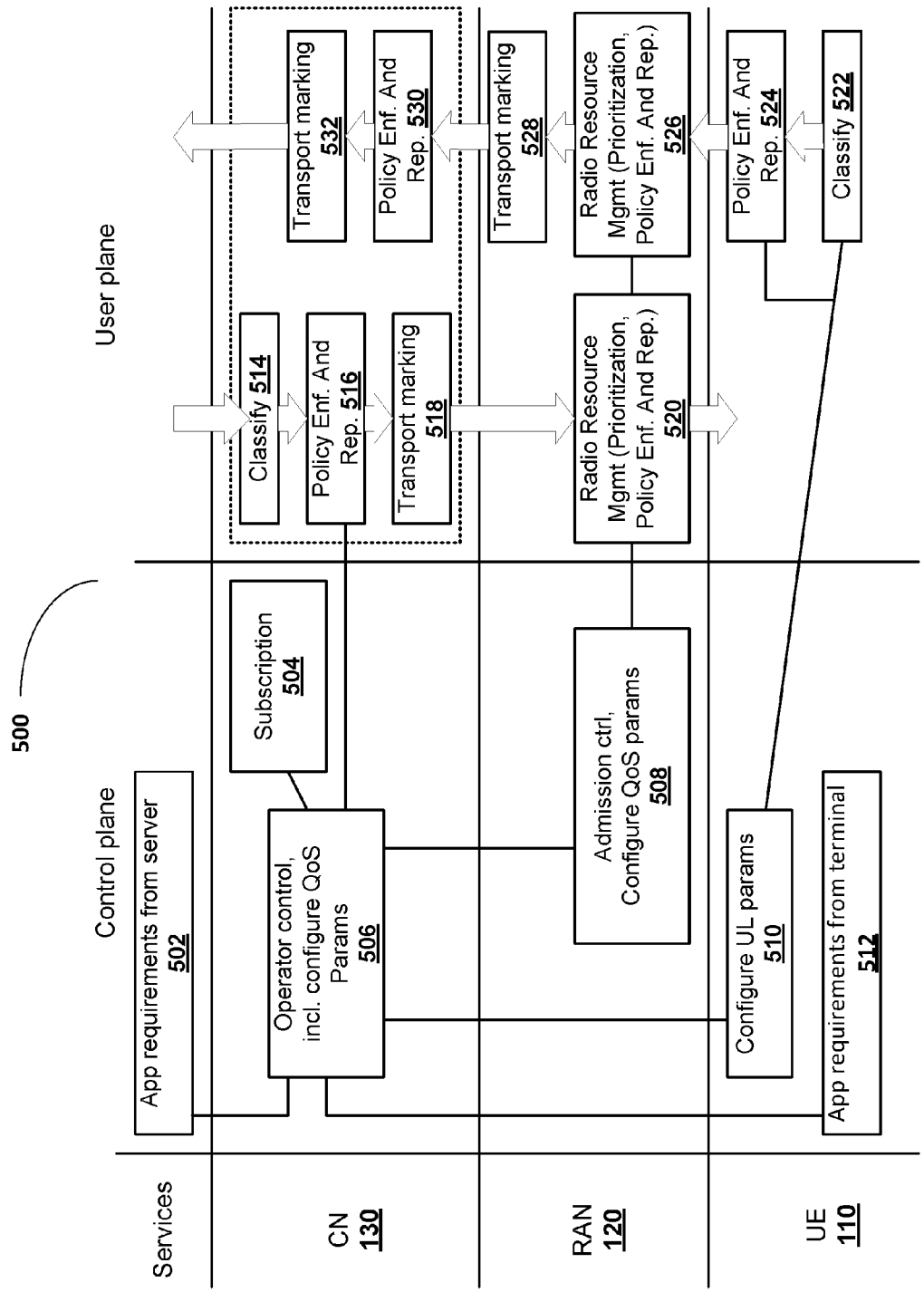
FIG. 5 is a functional diagram illustrating data content delivery performed over a communications network, according to another embodiment.

FIG. 5 is a functional diagram illustrating data content delivery performed over a communications network 500, according to another embodiment. FIG. 5 is similar to FIG. 3 except in that functional elements "Subscription" 504 and "Operator control, incl. Configure QoS Parameters" 506 in the Control Plane, and "Policy Enf. And Rep." 516, 520, 524, 526, 530 on the User Plane, involve differences in order to help measure and map parameters such as peak bit rate and average bit rate, to be applied in QoS management, traffic shaping, policy enforcement, and charging functionality. These mechanisms, for example, can control the maximum bit rate (and short-term bit rate) and monitor the average bit rate (and long term average bit rate) for QoS reporting purposes when delivering real-time video, or other bursty traffic in general.

In certain embodiments, the architecture shown in FIG. 5 may be described as a functional split when compared to that in FIG. 3 as shown in Table 2 below:

TABLE 2

QoS functional split between UE, AN, CN and SL

| Function | Distribution | Comment |
| --- | --- | --- |
| Subscription 504 (incl Default QoS Profile) | CN | |
| QoS Operator control 506 | CN | |
| Admission control 508 | AN | Admission to AN resources |
| Configuration of QoS parameters 506, 508, 510 | UE, AN, CN | |
| Application requirements input 502, 512 | From CN/SL to CN From UE/SL to CN From UE/SL to CN/SL | The application requirements input may be sent from either the server or the client. |
| Classification: 514, 522 | CN (DL), UE (UL) | Provides classification of packets for QoS purposes |
| Policy Enforcement and Report 516, 520, 524, 526, 530 | CN (DL, UL) AN (DL, UL) UE (UL) | Control the maximum rate and monitor the average rate for QoS reporting purpose |
| Transport marking 518, 528, 532 | AN (UL), CN (UL, DL) | |
| Resource Mgmt 520, 526 | AN | Packet scheduling with regards to resource utilization and availability (RRM) Resource mgmt is also performed in the transport domain (not shown) |

The Application requirements input from the SL 502 may be sent from the AF 418. In the CN 130 CP 132, the Operator control function 506 may be implemented as part of the PCF 410 or as part of the SMF 414, and the subscription may be stored at the UDR 402. The functions referred to in the above table may be further described as follows:

Subscription 504 (including Default QoS Profile): The subscription 504 includes information about which QoS parameters are included in the subscription terms. The subscription QoS is an input for the network when authorizing the QoS for a PDU session and a non-Service-specific PDU flow in the QoS Operator control function 506.

QoS Operator control 506: With inputs from subscriptions 504, operator policies and application requirements input 502 from the service layer, the QoS parameters for PDU sessions and PDU flows are authorized in the QoS Operator control function 506. In case of real-time video services, some internal QoS parameters for QoS control and monitoring can be derived from application requirements input 502. The QoS Operator control function 506 is also responsible for distributing the authorized QoS parameters in the network. In the case of PDU connectivity services provided in network sharing and/or roaming access, the QoS Operator Control function 506 may limit the QoS offered by the network providing the access.

Admission control 508 (AN): The admission control function 508 controls which PDU flows are to be admitted in the access network when the resources are scarce based on the QoS parameters applied for the session and flows. The admission control function 508 may also sacrifice already admitted flows to allow higher priority flows.

Configuration of QoS parameters 506, 508, 510: Each network element in the end-to-end solution is configured with the expected behaviour with respect to QoS, including how the QoS parameters received from the QoS Operator control function 506 will be handled and applied to the PDUs.

Application requirements input 502, 512: To know the requirements of the Service Data Flows (SDF) transmitted through the network, the network may be informed from the service layer about the service behaviour and service requirements. I.e., the network may receive application requirements input from the service layer. The application requirements input may also include the service behaviour and service requirements of SDF flows transmitted through the network. The application requirement input 502 is used by the QoS Operator control function 506 when authorizing the QoS parameters for PDU session and PDU flows.

Classification 514, 522: Indicates to which SDF flow each packet belongs. The classification 514, 522 is used to select which authorized QoS parameters to apply to each PDU in the CN-UP, AN-UP and UE-UP. Deducible SDFs may be classified based on Traffic Flow Template (TFT) filters in the DL and UL. Non-deducible SDFs may be classified in the DL based on packet inspection. UE reflective QoS according to TS 24.139, and packet inspection in CN-UP, may be used for classification of non-deducible IP flows in the UL.

Policy Enforcement and Report 516, 520, 524, 526, 530: The Policy Enforcement and Report function 516, 520, 524, 526, 530 ensures that the maximum bit rate allocation associated with the PDU flow in the Authorized QoS parameters is maintained. The maximum rate and average rate of the PDU flow are measured for QoS reporting purposes. The Policy Enforcement and Report function ("Policy Enf. and Rep") may be located at the UE/ED 110 (operating in the UP) (UL: 524), at the (R)AN 120 (operating in the UP) (DL: 520, UL: 526), and at the PCEF 422, UPF 420 or another function in the CN UP 134 (DL: 516, UL: 530). In some embodiment, the PCEF 422 (or portions of the function) may be co-located in the PCF 410. In a further embodiment the PCEF 422 may be instantiated at the same location as the PCF 410 and communicating with the UPF 420.

Transport marking 518, 528, 532: The transport marking function 518, 528, 532 indicates the expected treatment in IP networks with a stateless QoS mechanism, for example routers between the network elements.

Resource Management 520, 526: The resource management (mgmt.) function 520, 526 is responsible for how the resources are distributed in the access network based on the Authorized QoS parameters from the QoS Operator control function 506 and the monitoring of the fulfillment of the QoS targets. The resource management function 520, 526 can be different in 3GPP and non-3GPP ANs with regards to the possibilities to control resource utilization and availability. Resource management 520, 526 is also performed in the transport network.

In one embodiment, various parameters may be mapped to CODEC inputs to help perform traffic monitoring, policy enforcement such as traffic shaping behaviour in case of a policy violation and/or network congestion, and reporting functionality.

Due to the high peak rate involved with real-time video flows, video encoders (CODECs) and network functions need to have a common way to measure the average bit rate. A new parameter called "measurement window" may be added to enhance an end-to-end QoS guarantee for IMS services in Release 13 of 3GPP systems. This new parameter is proposed in the Next Generation QoS Solution 2.1 under the application requirements parameter "Requested Measurement Window Size". The actual measurement window in policy control functions may be set to be no longer than the "Requested Measurement Window Size". If it is not specified, the default value of "Requested Measurement Window Size" may be, for example, 2 seconds.

However, the above measurement window has typically been studied under the assumptions of conversational video services, which require the end-to-end packet delay of 150 ms, and where the transmission of large video frames can be averaged over multiple inter-video frame durations. For much shorter delay requirements, as low as 10 ms, the peak rate cannot be smoothed out in the same way. Next Generation systems should be able to handle the high peak rate in short durations once the video services are admitted to the network. Otherwise, important video packets of I-frames can be delayed or dropped. This leads to a prolonged poor video quality of one or several seconds, depending on the periodicity of I-frames.

To overcome the issues with current parameter mapping, a new approach enabling explicit signalling of application requirements for real-time video services may be provided. In real-time video for example, system parameters (from the UE or Application Function) such as "Maximum Bit rate" and "Minimum Bit rate" (that are measured by an appropriate function at a gateway node, for example) may be mapped to "short-term maximum peak rate" and "long-term minimum average rate", respectively (by the AF function 232, 418 for example), of a desired CODEC function. Further, the application input parameter "Requested Measurement Window Size" may be defined to monitor the long-term average bit rate in order to meet a "Minimum Bit rate" requirement. Alternatively, the application input parameter "Requested Measurement Window Size" may be defined to monitor the short-term average bit rate in order to meet a "Maximum Bit rate" requirement; this may be done for example based on the QoS of various service requests. In certain embodiments, new system internal parameters such as "Short-Term Measurement Window Size" and "Long-Term Measurement Window Size", may be defined to allow the monitoring of the short-term peak bit rate (with respect to Minimum Bit rate QoS parameters) and the long-term average rate (with respect to Minimum Bit rate QoS parameters) of real-time video flows for QoS policy enforcement and QoS monitoring purposes. These two parameters may be derived by the "Operator Control" function 506 in the CP 132 of the CN 130 (shown in FIG. 5), from application input parameters "Delay requirements" and "Requested Measurement Window Size". The "Operator Control" function 506 distributes these internal parameters to the RAN 120 and UP 134 functions for QoS policy enforcement and monitoring. For example, "Short-Term Measurement Window Size" may be set to half of the packet delay budget (e.g. from 15 ms to 7.5 ms), and "Long-Term Measurement Window Size" may be set equal to "Requested Measurement Window Size" (e.g. 2 seconds if not otherwise specified). In another example, if the "Requested Measurement Window Size" is provided equal to a small value of 10 ms, it is implicitly understood that this parameter is to measure the short-term peak bit rate. In this case, the "Short-Term Measurement Window Size" may be set to be equal to "Requested Measurement Window Size" or shorter, and "Long-Term Measurement Window Size" may be set equal to, e.g., 2 seconds. It should be understood that the example of 2 seconds for the Long-Term Measurement Window Size is an example only and that the Long-Term Measurement Window Size may also be set to a different predefined value. As noted above, the short-term measurement window and the long-term measurement window are differently sized and once determined for a PDU data flow, fixed in size. It should also be understood that the measured traffic parameters associated with the short-term measurement window are non-instantaneous parameters.

In some embodiments, a UE may be configured to implement QoS monitoring. The UE may comprise a radio access network interface for receiving and transmitting data to a network, a processor, and a non-transitory memory storing instructions that when executed by the processor configure the UE to receive, from a traffic monitor, traffic parameters associated with a PDU data flow carrying real-time traffic. The traffic parameters may be representative of measurements taken during a short-term measurement window and measurements taken during a long-term measurement window. The short-term measurement window and the long-term measurement window are differently sized. The UE may also be configured to change encoding parameters associated with the PDU data flow in accordance with the traffic parameters associated with the short-term measurement window and the long-term measurement window. Further, the UE may also be configured to transmit the PDUs in the PDU data flow encoded in accordance with the changed encoding parameters.

Figure 6:
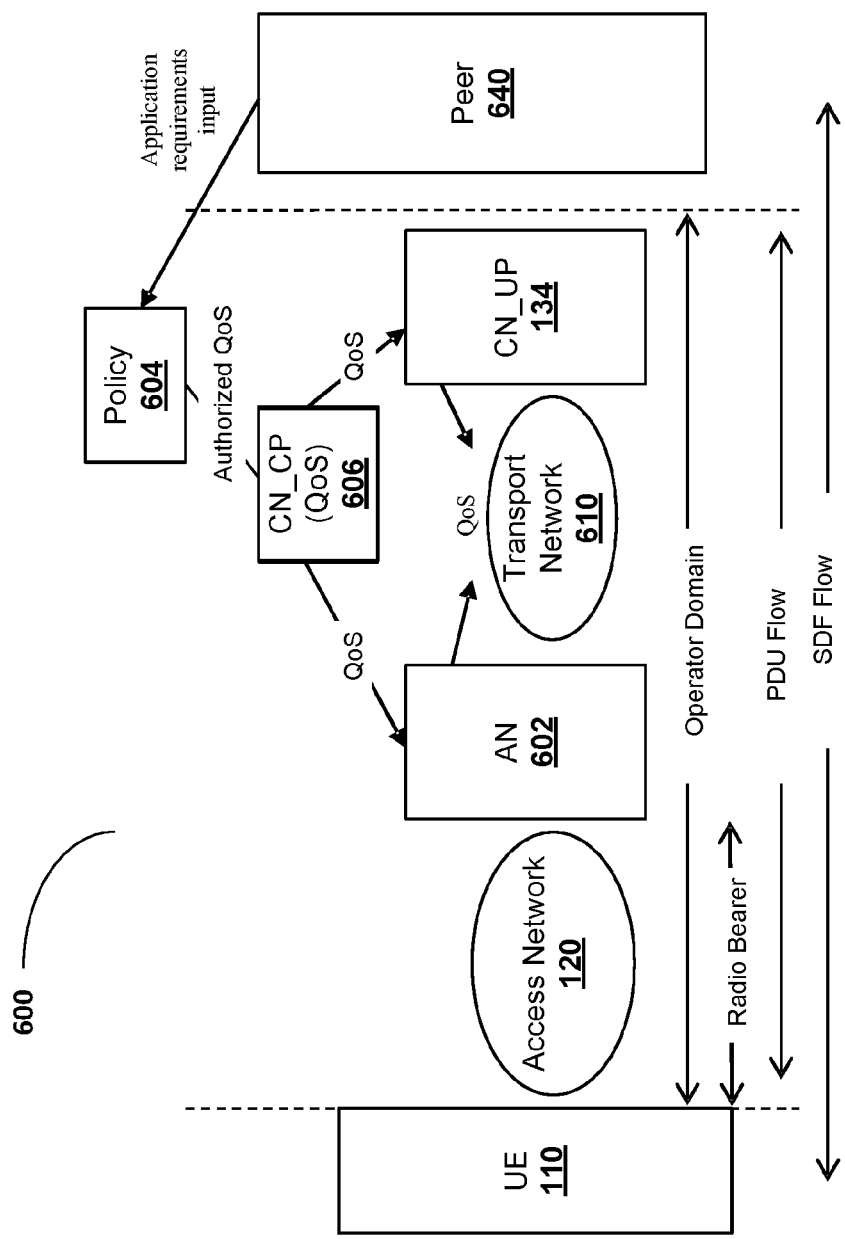
FIG. 6 is a component diagram illustrating the relation between Packet Data Unit (PDU) flow and Service Data Flow (SDF)

FIG. 6 is a component diagram illustrating the relation 600 between PDU flow and Service Data Flow (SDF). In some embodiments, video transmissions may involve PDU (packet data unit) flows between the network and the UE (ED 110). Such PDU flows occur within the Operator Domain between the Access Network 120 and the CN UP 132. The Access Network 120 between the UE and an Access Node 602 may comprise the radio bearer, including an air interface. The Peer 640 may comprise a data network 140, an IP multimedia subsystem or a 3GPP function. A PDU flow is a logical packet transport of defined characteristics (i.e. corresponding to a granularity of packet forwarding/treatment differentiation a PDU session can offer to a service data flow (SDF)). A SDF flow may occur between the UE and Peer 640. A PDU Session may be associated with a number of logical PDU flows realized in the UP layer. An application in the service layer may require one or multiple Service Data Flows that may be mapped into one or multiple PDU flows. A PDU flow between the UE and the CN-UP 134 may be compared to an EPS bearer within the EPS QoS framework. PDU flows may be classified into Service-specific and non-Service-specific PDU flows. QoS parameters assigned to a PDU flows and/or SDF may be enforced by network functions. Application requirements input may be transmitted by the Peer 640 to a Policy function 604, such as the PCF 410. Authorized QoS parameters may be passed from the Policy function 604 to a CN CP (QoS) function 606 which transmits the QoS parameters to the Access Node 602 and a node in the CN UP, such as the UPF 420. Communication transmissions between the Access Node 602 and the node in the CN UP 134 may be transmitted via a Transport Network 610 in compliance with the QoS parameters.

In certain embodiments, application requirements may be provided to the network in order to apply the correct QoS parameters to the Application's Service Data Flows. The application requirements information may be provided from the service layer (server or client side). Such information may include Service Identification, Service Behaviour and Service Requirements. Service Identification provides how to identify the Service Data Flows associated with the application. The Service Data Flows may be of IP type or non-IP type depending on the PDU session type. Service Behaviour (e.g. the behaviour the network can expect from the application), may include a Maximum bit rate per SDF (e.g. the Max bit rate that the service is expected to deliver. For real-time video services, the Maximum bit rate per SDF can include the short-term peak rate of video flow with respect to the packet delay requirement).

Service Requirements (e.g. the network delivery behaviour requested by the application), may include a Minimum bit rate per SDF, Delay requirements, priority between different SDFs within the application, requested network behaviour with respect to Admission, Retention and Notification, and a Requested Measurement Window Size. The Minimum bit rate per SDF is the bit rate that is required for the service to be delivered with sufficient QoE. For real-time video services, the minimum bit rate per SDF can include the long-term average the bit rate of video flow that is required for the service to be delivered with sufficient QoE. The Requested Measurement Window Size indicates the condition when observing the service behaviour and requirements fulfillment. For real-time video flows, the Requested Measurement Window Size can mean the long-term measurement window size to monitor the long-term average bit rate with respect to minimum bit rate.

Network Authorized QoS parameters are determined based on the subscription 504. Such parameters include application requirements input from the service layer 502 and QoS configuration, operator policies, and the QoS parameters for the PDU session, for Service-specific and non-Service-specific PDU flows, and for Service Data Flows. The QoS parameters per PDU session may include an aggregated maximum bit rate for the session.

Network Authorized QoS parameters per Service-specific and non-Service-specific PDU flows may also be determined, including: Traffic Flow Templates and filters, PDU Flow Priority, the Maximum bit rate per PDU flow, the required bit rate per PDU flow, delivery characteristics per PDU flow, and network behaviour per PDU flow. Traffic Flow templates and filters include classifying the service data flow to which the QoS parameters apply. The TFT filter is defined to classify IP and non-IP flows. For example, Ethernet flows may be classified based on an Ethernet p-bit. PDU Flow Priority includes the priority per PDU flow for admission to network resources (e.g. how the traffic associated with the flow is to be handled in the AN 602 at admission and resource management, and in the CN_UP 134). The Maximum bit rate per PDU flow includes the UL and DL authorized bit rate value for a single PDU flow. This applies to Service-specific and non-Service-specific PDU flows. For real-time video service, the Maximum Bit rate per flow PDU can mean the short-term maximum peak rate of video flow with respect to the packet delay requirements. The required bit rate per PDU flow includes the bit rate (Minimum or Guaranteed bit rate per flow) that is required for the service to be delivered with sufficient QoE. For real-time video flows, the Minimum Bit rate per PDU flow can mean the long-term average bit rate that is required for the service to be delivered with sufficient QoE. The delivery characteristic per PDU flow may include, for example, packet delay budget, packet loss/late rate. The delivery characteristics may be expressed via a scalar value such as the QoS Class Identifier (QCI) value, or explicitly indicated. Network behaviour per PDU flow includes the expected treatment if the QoS targets represented by the authorized QoS parameters for the flow are not met by the network.

QoS related parameters per Service Data Flow may also be determined, which include: Traffic Flow Templates and filters, SDF Priority, Maximum bit rate per SDF, required bit rate per SDF, delivery characteristics per SDF, and Network Behaviour per Service Data flow. Traffic Flow Templates and filters include classifying the service data flow to which the QoS parameters apply. The TFT filter is defined to classify IP and non-IP flows. For example, Ethernet flows may be classified based on Ethernet p-bit. SDF Priority includes the priority per SDF for admission to network resources (e.g. how the traffic associated with the flow is to be handled in the network at admission and resource management and in CN_UP 134). The Maximum bit rate per SDF includes UL and DL authorized bit rate value for a single SDF. For real-time video service, the Maximum Bit rate per SDF may include the short-term peak rate of video flow with respect to the packet delay requirements. The required bit rate per SDF includes the bit rate (Minimum or Guaranteed bit rate per flow) that is required for the service to be delivered with sufficient QoE. For real-time video services, the Required Bit rate per SDF includes the long-term average bit rate may correspond to the minimum QoE level. The delivery characteristic per SDF includes, for example, packet delay budget, and packet loss/late rate. The delivery characteristics may be expressed via a scalar value such as the QCI value, or explicitly indicated. Network behaviour per Service Data flow includes the expected treatment if the QoS targets represented by the authorized QoS parameters for the flow are not met by the network. I.e., the Network behaviour per Service Data flow may be instructions for a traffic shaping action, or an indication of a traffic shaping action, that the UP is to perform if the QoS targets are not met.

Flow Priority is a parameter indicating the relative priority of fulfilling the Required Bit Rate and delivery characteristics (delay budget, packet loss/late rate). It impacts both the SDF/PDU flow admission to resources in the network as well as the distribution of resources for packet forwarding treatment, allowing consistency in admission and resource distribution to fulfil the service requirements.

Network behaviour per flow may indicate the behaviour with respect to Admission of the flow, Retention of the flow and Notifications pertaining to the flow. With respect to Admission of the flow, network behaviour may indicate if the flow is to be admitted in the network even if there are not enough network resources to fulfil the service requirements (required bit rate and/or delivery characteristics) associated with the flow cannot be met (e.g. a Keep/Drop indication). With respect to Retention of the flow, network behaviour per flow may indicate if the flow can be discontinued to allow the network to admit a flow with higher priority (e.g. a Retain/May be dropped indication). With respect to Notifications pertaining to the flow, network behaviour may indicate if a network element is to send a notification (to the policy function 606) if the service requirements associated with the flow cannot be met (e.g. a Yes/No indication). The Network behaviour may apply to both the SDF/PDU flows.

QoS Policy Enforcement and Report parameters may also be determined. For example, the maximum bit rate and minimum bit rate may be measured to ensure reliable QoS delivery. Two internal parameters "Long-Term Measurement Window Size" and "Short-Term Measurement Window Size" may be derived by the "Operator Control" function 506 of the CN CP 132 from application requirements input 502 parameters "Delay Requirements" and "Required Measurement Window Size". For non-real-time services, the "Long-Term Measurement Window Size" and "Short-Term Measurement Window Size" can be set equal to the input parameter "Required Measurement Window Size". To reduce the signalling overhead, only the "Long-Term Measurement Window Size" may be forwarded from the CN CP 132 to the RAN 120 and UP functions.

Figure 7:
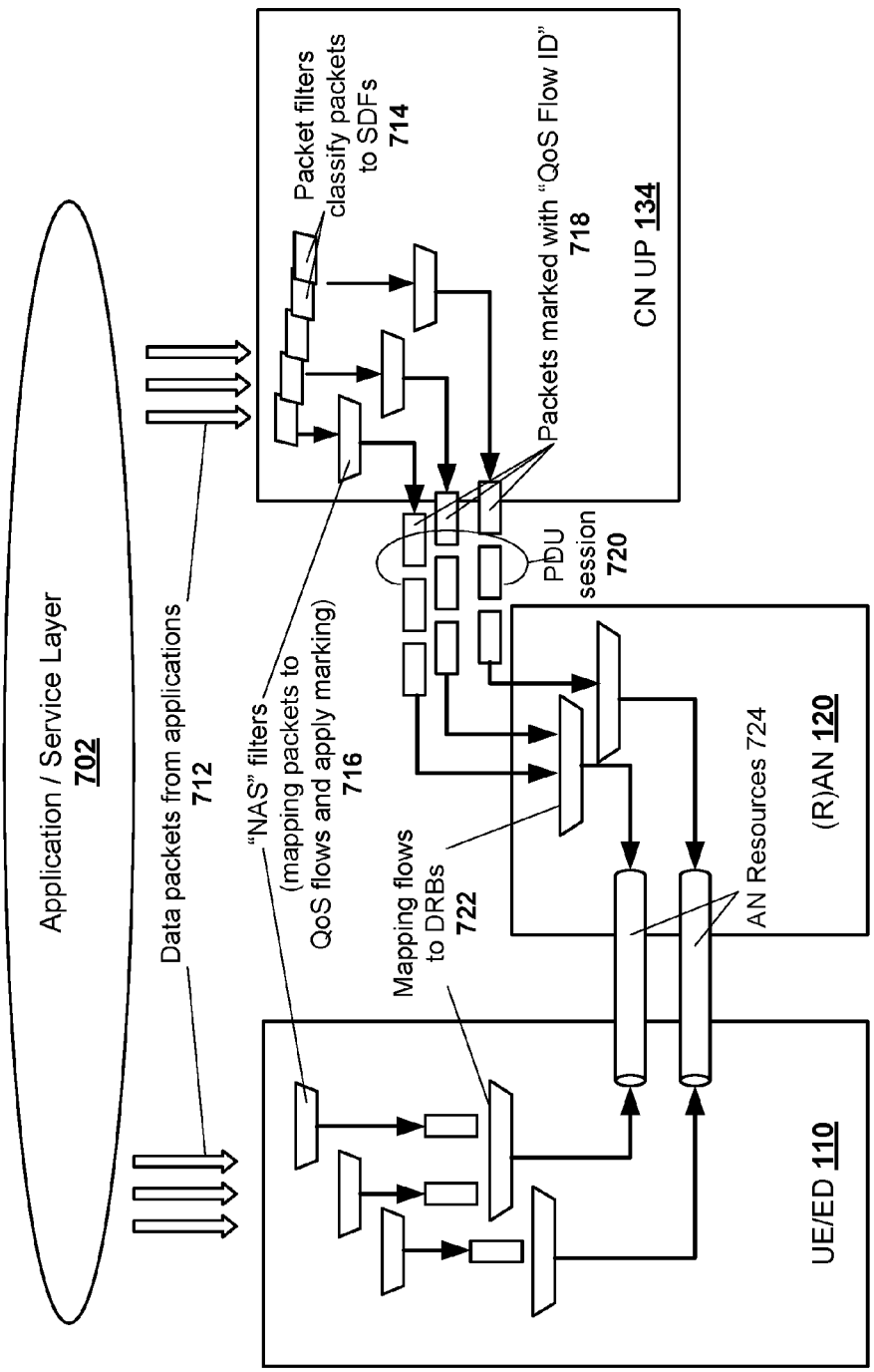
FIG. 7 is a component diagram illustrating an example of a system for classification and User Plane (UP) marking for Quality of Service (QoS) flows, in accordance with embodiments of the present invention.

FIG. 7 is a component diagram illustrating an example of a system for classification and UP marking for QoS flows 700, in accordance with embodiments of the present invention. The system 700 is part of a 5G QoS model that supports a QoS flow based framework as described in TS 23.501 Version V0.4.0 published April 2017 and other versions such as Version V0.5.0 published May 2017. A QoS Flow ID (QFI) may be used to identify a QoS flow in a 5G system. UP traffic with the same QFI within a PDU session receives the same traffic forwarding treatment (e.g. scheduling, admission threshold). The QFI is carried in an encapsulation header on a N3 interface (and N9 interface), i.e. without any changes to the end-to-end packet header. It can be applied to PDUs with different types of payload, i.e. IP packets, non-IP PDUs and Ethernet frames. The QFI should be unique within a PDU session. Policing of UP traffic (e.g. Maximum Flow Bit Rate (MFBR) enforcement) may be performed by UPFs 420 on a SDF level granularity.

Each QoS flow (GBR and Non-GBR) may be associated with QoS parameters, such as a 5G QoS Indicator (5QI), an Allocation and Retention Priority (ARP), a Guaranteed Flow Bit Rate (GFBR)—UL and DL, a Maximum Flow Bit Rate (MFBR)—UL and DL, and a Notification control. The Operator control function 506 may configure these QoS parameters based on the Application requirements 502 sent by the service layer 702 (e.g., from the Application Function 418 or the UE/ED 110). The Operator control function 506 may then send these configured QoS parameters to the UE, RAN 120, and CN UP 134 (e.g. to the UPF 420), as described above.

A 5QI is a scalar that is used as a reference to 5G QoS characteristics, i.e. to access node-specific parameters that control QoS forwarding treatment for the QoS flow (e.g. scheduling weights, admission thresholds, queue management thresholds, link layer protocol configuration, etc.).

The QoS parameter ARP includes information about the priority level, the pre-emption capability and the pre-emption vulnerability. The priority level defines the relative importance of a resource request. This provides information to determine whether a new QoS flow may be accepted or needs to be rejected in case of resource limitations (typically used for admission control of GBR traffic). It may also be used to decide which existing QoS flow to pre-empt during resource limitations.

The Guaranteed Flow Bit Rate (GFBR), for both the UL and DL, denotes the bit rate that may be expected to be provided by a GBR QoS flow. The "long-term minimum average rate", described above, can be mapped to the GFBR. The Maximum Bit Rate (MFBR), for both UL and DL, limits the bit rate that may be expected to be provided by a GBR QoS flow (e.g. excess traffic may get discarded by a rate shaping function). The "short-term maximum peak rate", described above, can be mapped to the MFBR. The GFBR and MFBR are signalled on N2, N11, and N7 interfaces for each of the GBR QoS Flows for setting up the 5G QoS profile. The MBR per SDF, based on the information received from PCF 410, is signalled on N7 and N4 interfaces.

Each PDU Session of a UE may be associated with a per Session Aggregate Maximum Bit Rate (Session-AMBR) QoS parameter. The subscribed Session-AMBR is a subscription parameter. The SMF 414 may use the subscribed Session-AMBR or modify it based on local policy or use the authorized Session-AMBR received from the PCF 410 to get the Session-AMBR, which is signalled on a N4 interface to the appropriate UPF 420. The Session-AMBR limits the aggregate bit rate that can be expected to be provided across all Non-GBR QoS flows for a specific PDU session.

Each UE may be associated with a per UE Aggregate Maximum Bit Rate (UE-AMBR) QoS parameter. The UE-AMBR limits the aggregate bit rate that can be expected to be provided across all Non-GBR QoS flows of a UE. Each (R)AN 120 may set its UE-AMBR to the sum of the Session-AMBR of all PDU Sessions with active user plane to this (R)AN 120 up to the value of the subscribed UE-AMBR. The subscribed UE-AMBR is a subscription parameter which is retrieved from UDM and sent to the (R)AN 120 by the AMF 412. The Session-AMBR is sent to the (R)AN 120 by the SMF 414.

The Notification control may be provided for GBR QoS flows. The Notification control indicates whether notification should be made by the RAN 120 if the QoS targets cannot be fulfilled for a QoS flow during the lifetime of the QoS flow. If it is set and QoS targets cannot be fulfilled, the RAN 120 sends a notification to the SMF 414.

The QoS parameters of a QoS flow may be sent by the Operator control function 506 to the (R)AN 120 as a QoS profile over a N2 reference point at PDU Session or at QoS flow establishment and when 5G-RAN is used at every time the UP is activated. QoS parameters may also be pre-configured in the (R)AN 120 for non-GBR QoS flows (i.e. without the need to be signalled over the N2 interface).

As shown in FIG. 7, and similar to FIG. 5, the UE may perform the classification 714 and marking 716 of UL UP traffic, i.e. the association of UL traffic to QoS flows, based on QoS rules. These rules may be explicitly signaled over a N1 interface (at PDU Session establishment or QoS flow establishment), pre-configured in the UE or implicitly derived by the UE from reflective QoS. A QoS rule may include a QoS rule identifier, the QFI of the QoS flow, and a QoS flow template (i.e. the set of packet filters and corresponding precedence values associated with the QoS flow).

The SMF 414 allocates the QFI for every QoS flow and derives its QoS parameters from the information sent by the PCF 410 (which may include Application requirements the PCF 410 received from the AF 418 or UE). When applicable, the SMF 414 provides the QFI together with the QoS profile containing the QoS parameters of a QoS flow to the (R)AN 120. The SMF 414 provides the SDF template (i.e. the set of packet filters associated with the SDF received from the PCF 410) together with the SDF precedence and the corresponding QFI to the UPF 420 enabling classification and marking of UP traffic. When applicable, the SMF 414 generates the QoS rule(s) for the QoS flow by allocating QoS rule identifiers, adding the QFI of the QoS flow, and setting the QoS flow template using one or more SDF template(s). The QoS rules are then sent to the UE enabling classification and marking of UL UP traffic.

In the DL direction, incoming data packets 712 are classified 714 based on SDF templates according to their SDF precedences. The CN 130 conveys the classification of the UP traffic belonging to a QoS flow through an N3 (and N9) UP marking 716 using a QFI 718. The AN 120 binds 722 QoS flows to AN resources 724 (i.e. Data Radio Bearers in case of in case of 3GPP RAN).

In the UL direction, the UE classifies packets 712 based on the QoS flow template in the QoS rules and conveys the classification of the UP traffic belonging to a QoS flow through a UP marking 716 using the QFI in the corresponding QoS rule. The UE binds 722 QoS flows to AN resources 724.

When processing DL traffic, the UPF 420 (or another function in the CN UP 134) maps UP traffic to QoS flows based on the SDF templates, performs Session-AMBR enforcement and also performs PDU counting for support of charging. The UPF 420 also transmits the PDUs of the PDU session in a single tunnel between 5GC (CN 130) and the (R)AN 120 (with the QFI in the encapsulation header). The UPF 420 also performs transport level packet marking 716 in the DL, e.g. setting the DiffSery Code point in outer IP header. Transport level packet marking 716 may be based on the 5QI and ARP of the associated QoS flow.

When processing UL traffic, the UE uses the stored QoS rules to determine the mapping 722 for each UL UP traffic QoS flow, and transmits the UL PDUs using the corresponding access specific resource for the QoS flow based on the mapping sent by the RAN 120. The (R)AN 120 transmits the PDUs over a N3 tunnel towards the UPF 420. When transmitting an UL packet from to the CN 130, the (R)AN 120 determines the QFI value, which is included in the encapsulation header of the UL PDU, and selects the N3 tunnel. The (R)AN 120 performs transport level packet marking in the UL. Such transport level packet marking may be based on the 5QI and ARP of the associated QoS Flow. The UPF 420 verifies whether QFIs in the UL PDUs comply with the QoS Rules associated with the packet flow. These rules may be sent to the UE or implicitly derived by the UE (e.g. in case of reflective QoS). The UPF 420 performs Session-AMBR enforcement and counting of packets for charging.

A Packet Delay Budget (PDB) is a QoS characteristic that describes one aspect of a packet forwarding treatment that a QoS flow receives edge-to-edge between the UE and the UPF 402. The PDB defines an upper bound for the time that a packet may be delayed between the UE and the UPF 420 that terminates the N6 interface. For a certain 5QI the value of the PDB is the same in the UL and DL. In the case of 3GPP access, the PDB is used to support the configuration of scheduling and link layer functions (e.g. the setting of scheduling priority weights and Hybrid Automatic Repeat reQuest (HARQ) target operating points). The PDB denotes an end-to-end "soft upper bound". For real-time video flows, the "short-term measurement window size" and "long-term measurement window size" parameter may be derived by the PCF 410, the SMF 414, or the PCEF control function collocated in the SMF 414, from the PDB and input parameters provided by the AF 418. For example, the short-term measurement window size can be k times the PDB, where k is a positive number such as k=0.5. The long-term measurement window size can be set to be multiple times the length of a group of pictures, for example, a predefined value of 2 seconds. Is should be understood that the example of 2 seconds for the Long-Term Measurement Window Size is an example only and that the Long-Term Measurement Window Size may also be set to a different predefined value.

In some embodiments, the operations of the Operator control function 506 may be implemented in the PCF 410 or SMF 414. If the PCF 410 derives the Short-Term and Long-Term Measurement Window parameters, and a T-peak parameter (described further below), the PCF 410 may send these parameters to the SMF 414 via the N7 reference point. The SMF 414 may then send those parameters to the PCEF 422 via the N4 reference point, to the (R)AN 120 via the N11 and N2 reference points, and to the UE/ED 110 via the N11 and N1 reference points. If the SMF 414 derives the Short-Term and Long-Term Measurement Window parameter, and T-peak parameter, the SMF 414 may send these parameters to the PCEF 422 via the N4 reference point, to the (R)AN 120 via the N11 and N2 reference points, and to the UE/ED 110 via the N11 and N1 reference points.

Figure 8:
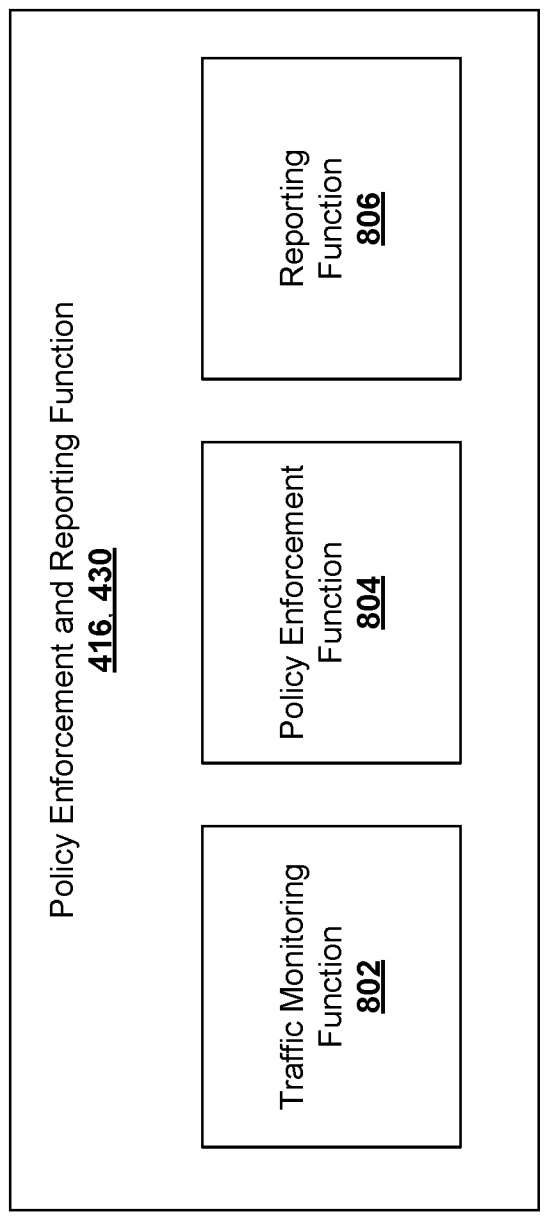
FIG. 8 is a component diagram illustrating an example of a Policy Enforcement and Reporting Function in the Core Network (CN) UP, in accordance with embodiments of the present invention.

FIG. 8 is a component diagram illustrating an example of a Policy Enforcement and Reporting Function (PERF) 516, 520, 524, 526, 530, in accordance with embodiments of the present invention. The PERF 516, 520, 524, 526, 530 comprises a Traffic monitoring function 802, a Policy Enforcement function 804 and a Reporting function 806, all of which are further described below. The PERF 524 may be implemented in a UE/ED 110. The PERF 520, 526 may be implemented in the (R)AN 120. The PERF 516, 530 may be implemented in the CN UP 134. It should be noted that PERF 520 and PERF 526 may be different instantiations of the same function implemented on a server at the (R)AN 120. Also, PERF 516 and PERF 530 may be different instantiations of the same function implemented on a server at the CN UP 134. In some embodiments, portions of the PERF may be implemented on a combination of a server operating in the UP of the CN 130, on a server operating in the UP of the RAN 120, and on an ED 110 (e.g., UE).

In certain embodiments, the "Policy EMI and Rep" (i.e. PERF) 516, 520, 524, 526, 530 function in the UP of FIG. 5 may include a Traffic monitoring function 802 which can be applied to all types of bursty traffic, including real-time video. In an embodiment, this traffic monitoring function 802 may be implemented in the PERF 516, 520, 524, 526, 530 implemented at the UE/ED 110, the (R)AN 120, and CN functions operating in the UP. In a further embodiment, the traffic monitoring function 802 may be implemented at the UE/ED 110, at a node in the (R)AN 120, and at the PCEF 422, UPF 420 or another function in the CN UP 134. The traffic monitoring function 802 can be operable to monitor a short-term bit rate, for example by averaging the data rate over the "short-term measurement window size". I.e., the PERF 516, 520, 524, 526, 530 may transmit an instruction to the traffic monitoring function 802 to monitor and/or measure traffic characteristics or parameters such as a first bit rate (e.g., short-term bit rate). For example, the short-term bit rate of a PDU data flow may be measured by averaging the data rate of the PDU data flow over a first time period (e.g., short-term measurement window). The PERF 516, 520, 524, 526, 530 may then receive from the traffic monitor (traffic monitoring function 802) the traffic parameters associated with the PDU data flow. Further, the network or UE may forward packets such that the measured short-term bit rate is not beyond the "Maximum bit rate" parameter, and the system may forward packets such that the measured long-term average rate is not below the "Minimum bit rate" parameter. I.e., signaling instructions may be transmitted by the PERF 516, 520, 524, 526, 530 for the enforcement of a traffic shaping policy. For example, the network or UE may transmit packets of the PDU data flow such that the measured first bit rate (e.g. short-term bit rate) is not higher a third bit rate (e.g. maximum bit rate). The traffic shaping policy may also shape the PDU data flow such that a minimum resource reservation for the PDU data flow in the network is ensured. Thus, when the resources are required, the system may transmit packets of the PDU data flow such that a measured second bit rate (e.g. long-term average rate) is not below a fourth bit rate (e.g. minimum bit rate). The traffic shaping policy may comprise instructions to apply traffic shaping to the PDU data flow.

As noted above, the maximum bit rate and the minimum bit rate are examples of QoS parameters that are provided by a CP function to a UP function. The measured short-term bit rate and the measured long-term average rate are examples of traffic characteristics or parameters associated with the PDU data flow that are measured by the UP function. The measured traffic parameters are compared to corresponding determined QoS parameters to monitor if a QoS for the PDU data flow is being met. The monitoring duration may also be defined when the short-term peak rate is equal to the "maximum bit rate". Thus, a third time period may be defined as the duration when the first bit rate is equal to or above the third bit rate. I.e., the measured first bit rate (e.g. short-term bit rate) that is at or above the maximum bit rate is the short-term peak rate. For example, an internal parameter T-peak (seconds) measures the maximum duration that the system can support a flow to send data at the "maximum bit rate". Thus, a fourth time period may be defined as this maximum duration. For example, for real-time video services, T-peak may be set equal to a multiplicity factor k of packet delay budget of 10 ms. For example, k=1.5, which leads to T-peak=15 ms. For non-real-time services, the T-peak can be set equal to a few minutes or void to indicate that the T-peak duration is not monitored. If the short-term bit rate is equal to the "maximum bit rate", the duration of this peak rate may be set not longer than the duration of T-peak. The maximum rate and average rate can also be measured for QoS reporting purposes.

In certain embodiments, the "Policy Enf. and Rep" 516, 520, 524, 526, 530 function in the UP of FIG. 5 may include a Policy Enforcement function 804 which can be applied to all bursty traffic, including real-time video. In an embodiment, this policy enforcement function 804 may be implemented in the Policy Enf. and Rep. functions 516, 520, 524, 526, 530 implemented at the UE/ED 110 and the (R)AN 120, and CN functions operating in the UP. In a further embodiment, the policy enforcement function 804 may be implemented at the UE/ED 110, at the (R)AN 120, and at the PCEF 422, UPF 420 or another function in the CN UP 134. The Policy Enforcement function 804 provides traffic shaping when the peak rate duration is longer than the T-peak parameter (e.g. when the third time period is longer than the fourth time period), allowing for packets to be dealt with in various ways. For example, packets can be sent through the system if the resources are available, delayed longer if there is non-real-time traffic (for example, the delay time can be longer than the "packet delay budget" if the long-term average bit rate (e.g. second bit rate) is not below the "minimum bit rate" (e.g. fourth bit rate)), or dropped if the queuing time is longer the packet delay budget or the packet buffer is full. It is understood that PDUs may be stored in a packet buffer if a data rate, such as the short-term bit rate, is higher than the maximum bit rate associate with the PDU data flow. If packets are dropped, the number of dropped packets may be recorded. The long-term overall packet drop rate (or packet loss rate) may be limited to the packet loss rate requirement. In cases where there are traffic violations (duration for which the maximum bit rate is longer than T-peak), the packet loss rate may exceed the required packet loss rate; this event can be recorded and reported accordingly.

In certain embodiments, the "Policy Enf. and Rep" 516, 530 function in the UP of FIG. 5 may include a Reporting function 806 which can be applied to all bursty traffic, including real-time video. In an embodiment, a User Charging Repository may be part of the UDR 402, PCF 410, OCS 406 or UDSF. In a further embodiment, this Reporting function 806 may also be implemented in the Policy Enf. and Rep. functions 516, 520, 524, 526, 530 implemented at the UE/ED 110 and the (R)AN 120, and CN functions operating in the UP. In yet a further embodiment, the traffic monitoring function 802 may be implemented at the UE/ED 110, at a node in the (R)AN 120, and at the PCEF 422, UPF 420 or another function in the CN UP 134. The Reporting function 806 reports and records certain events to a User Charging Repository, for use in determining charges to a customer or users. For example, the duration when the short-term measured bit rate (peak rate) is longer than T-peak monitoring parameter, the number of packet lost or packet loss rate due to buffer overflow (for example when network is congested or the user data rate violates the "maximum bit rate" parameter), and the duration when the long-term measured bit rate (average bit rate) is below the "minimum bit rate", can each be reported and recorded for use in determining charges. The reason for events can be included in the report, for example due to traffic violation, packet delay, no incoming packets, or low incoming bit rates.

Figure 9A:
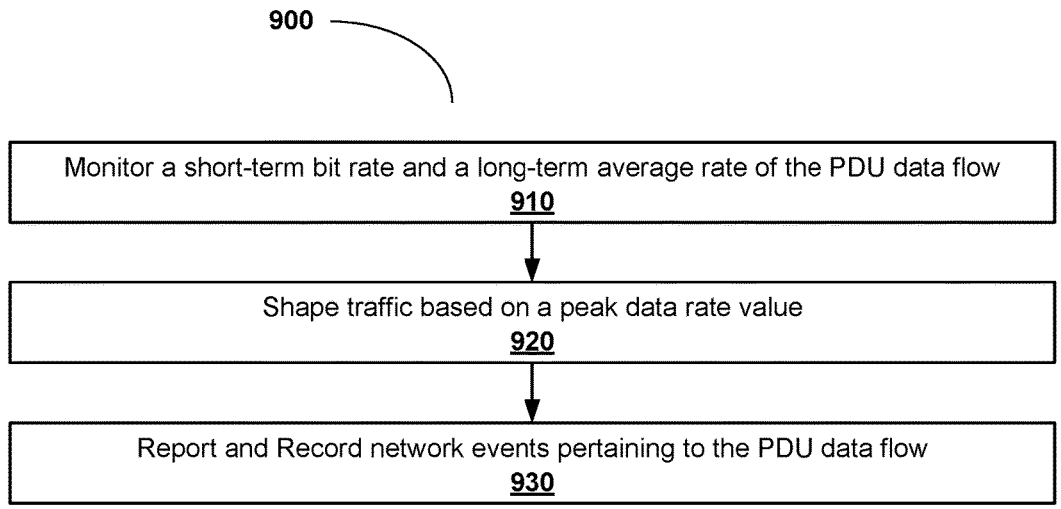
FIG. 9A is a flowchart illustrating an example of a method of performing policy enforcement and reporting of events in a PDU data flow, in accordance with embodiments of the present invention.

FIG. 9A is a flowchart illustrating an example of a method of performing policy enforcement and reporting 900 of a packet data unit (PDU) data flow, in accordance with embodiments of the present invention. The method 900 comprises monitoring a first bit rate (e.g. a short-term bit rate) and a third bit rate (e.g. a long-term average rate) of the PDU data flow 910, shaping traffic based on a peak data rate value 920, and reporting and recording network events pertaining to the PDU data flow 930. It should be understood that the performing can include a network function transmitting signaling messages comprising instructions to one or more network functions to perform the steps.

Figure 9B:
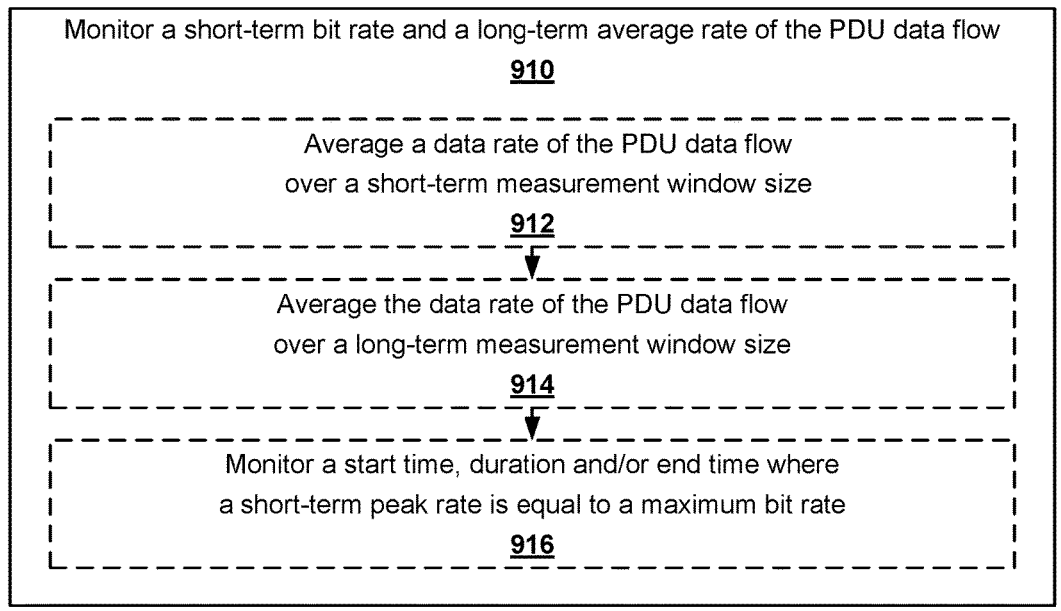
FIG. 9B is a flowchart illustrating an example of a method of monitoring a short-term bit rate and a long-term average rate of the PDU data flow, in accordance with embodiments of the present invention.

FIG. 9B is a flowchart illustrating an example of a method of monitoring a short-term bit rate and a long-term average rate of the PDU data flow 910, in accordance with embodiments of the present invention. In an embodiment, the method 910 may be performed by the traffic monitoring function 802. The method 910 comprises averaging a data rate of the PDU data flow over a short-term measurement window size 912, averaging the data rate of the PDU data flow over a long-term measurement window size 914, and monitoring a start time, duration and/or end time where a short-term peak rate is equal to or larger than a maximum bit rate 916. In an embodiment, other steps may be added to the method 910. The short-term bit rate (first bit rate) may be measured by averaging a data rate of the PDU data flow over a short-term measurement window size (first time period). As described above, the short-term measurement window may be set to least one of a requested measurement window size, a factor of a packet delay budget, and a predetermined value. The long-term average rate (third bit rate) may be measured by averaging the data rate of the PDU data flow over a long-term measurement window size (second time period). As described above, the long-term measurement window is set to at least one of a requested measurement window size, a factor of a packet delay budget, and a predetermined value. A start time, duration (third time period) and/or end time may be monitored where a short-term peak rate (first bit rate as described above) is equal to a maximum bit rate (third bit rate). As described above, an internal parameter, T-peak, may be set to measure at least one of a start time, maximum duration (fourth time period) and/or an end time where the PDU data flow is transmitted at the maximum bit rate (third bit rate). It should be understood that the monitoring can include a network function transmitting signaling messages comprising instructions to another network function to perform the monitoring.

Figure 9C:
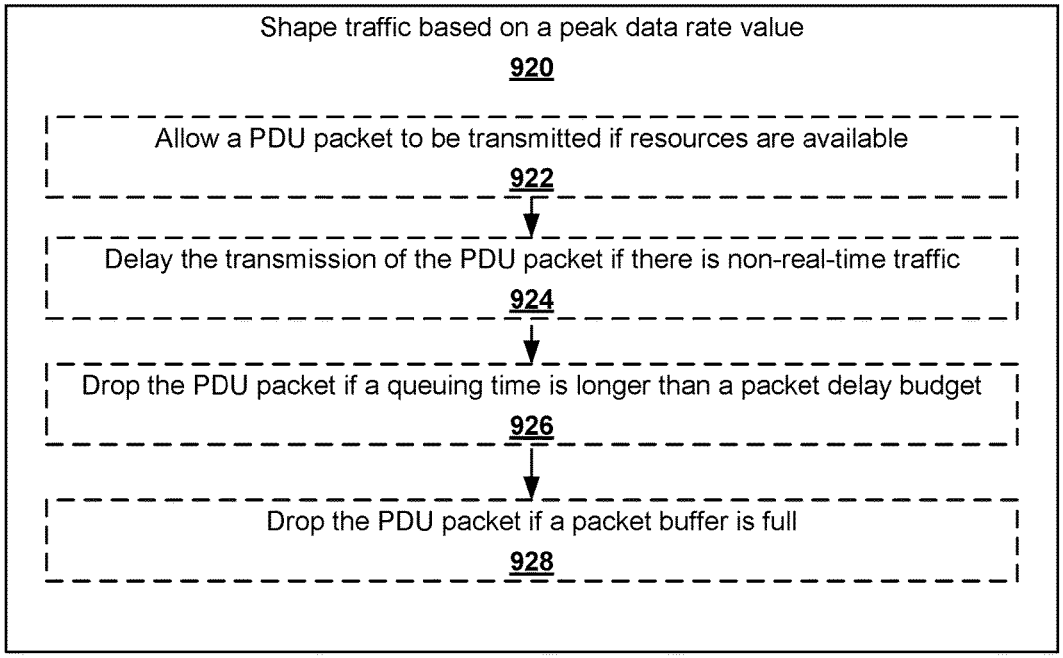
FIG. 9C is a flowchart illustrating an example of a method of shaping traffic when a peak data rate duration is longer than a T-peak parameter, in accordance with embodiments of the present invention.

FIG. 9C is a flowchart illustrating an example of a method of shaping traffic based on a peak data rate value 920, in accordance with embodiments of the present invention. In an embodiment, the method 920 may be performed by the Policy Enforcement function 804. The method 920 comprises allowing a PDU packet to be transmitted if resources are available 922, delaying the transmission of the PDU packet if there is non-real-time traffic 924, dropping the PDU packet if a queuing time is longer than a packet delay budget 926, and dropping the PDU packet if a packet buffer is full 928. In an embodiment, other steps may be added to the method 920, including receiving a notification from the traffic monitoring function that a peak rate duration is longer than a T-peak parameter value. To delay the transmission of the PDU packet, the delay time may be set to be longer than a packet delay budget. It should be understood that the performing can include a network function transmitting signaling messages comprising instructions to another network function to perform the traffic shaping.

Figure 9D:
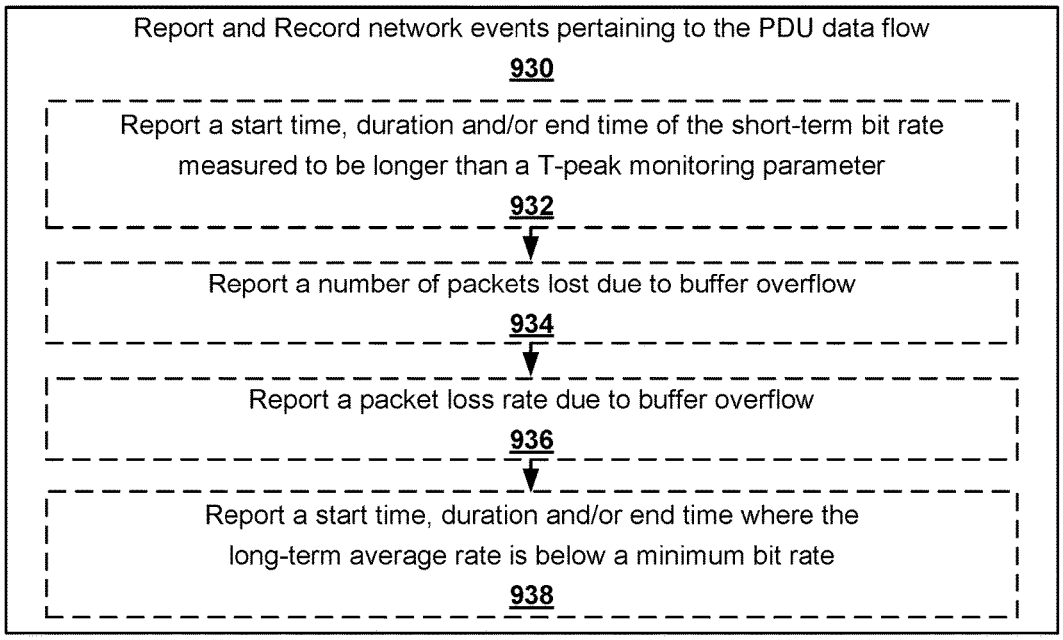
FIG. 9D is a flowchart illustrating an example of a method of reporting and recording network events pertaining to the PDU data flow, in accordance with embodiments of the present invention.

FIG. 9D is a flowchart illustrating an example of a method of reporting and recording network events pertaining to the PDU data flow 930, in accordance with embodiments of the present invention. In an embodiment, the method 930 may be performed by the Reporting function 806. The method 930 comprises reporting a start time, duration (third time period), and end time of the short-term bit rate (first bit rate) measured to be longer than a T-peak (fourth time period) monitoring parameter 932, reporting a number of packets lost due to buffer overflow 934, reporting a packet loss rate due to buffer overflow 936, and reporting a duration where the long-term average rate (second bit rate) is below a minimum bit rate (fourth bit rate) 938. In an embodiment, other steps may be added to the method 930, including recording the start time, duration and/or end time of the short-term bit rate measured to be longer than a T-peak monitoring parameter value, recording a number of packets lost due to buffer overflow, recording a packet loss rate due to buffer overflow, and recording a start time, duration and/or end time where the long-term average rate is below a minimum bit rate. These events may be recorded in a repository accessible to a charging system. It should be understood that the performing can include a network function transmitting signaling messages comprising instructions to another network function to perform the reporting and/or recording.

Figure 9E:
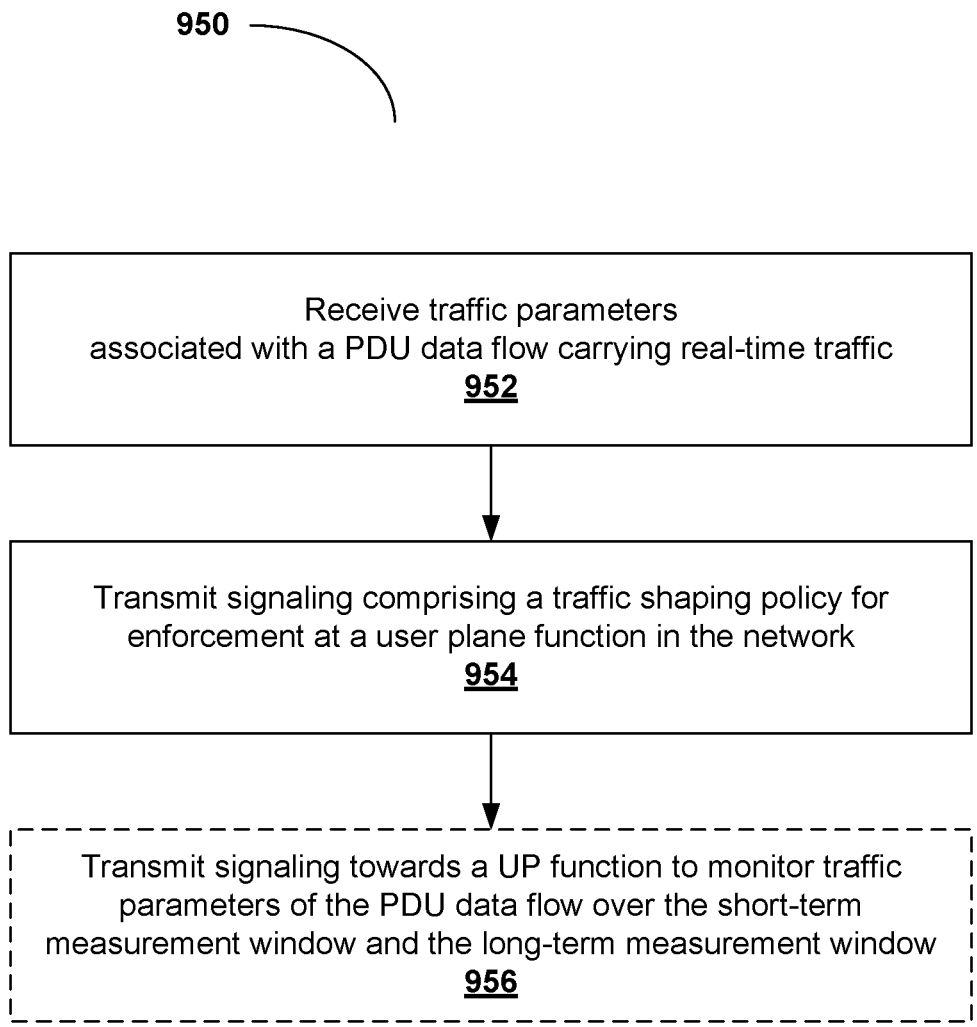
FIG. 9E is a flowchart illustrating an example of a method, for execution at a policy enforcement and reporting function in a network, in accordance with embodiments of the present invention.

FIG. 9E is a flowchart illustrating an example of a method 950, for execution at a policy enforcement and reporting function in a network, in accordance with embodiments of the present invention. The method comprises receiving traffic parameters associated with a PDU data flow carrying real-time traffic 952, and transmitting signaling comprising a traffic shaping policy for enforcement at a user plane function in the network 954. The traffic parameters are received from a traffic monitor 802. The traffic parameters are representative of measurements taken during a short-term measurement window (first time period) and measurements taken during a long-term measurement window (second time period), as described above. The short-term measurement window and the long-term measurement window are differently sized. The traffic shaping policy is associated with the PDU data flow and is in accordance with the traffic parameters associated with the short-term measurement window and the long-term measurement window. Other steps may be optionally added to the method 950, including transmitting signaling towards a UP function to monitor traffic parameters of the PDU data flow over the short-term measurement window and the long-term measurement window 956. In some embodiments, different combinations of the methods shown in FIGS. 9A to 9E may be applied to a PDU data flow.

Figure 10:
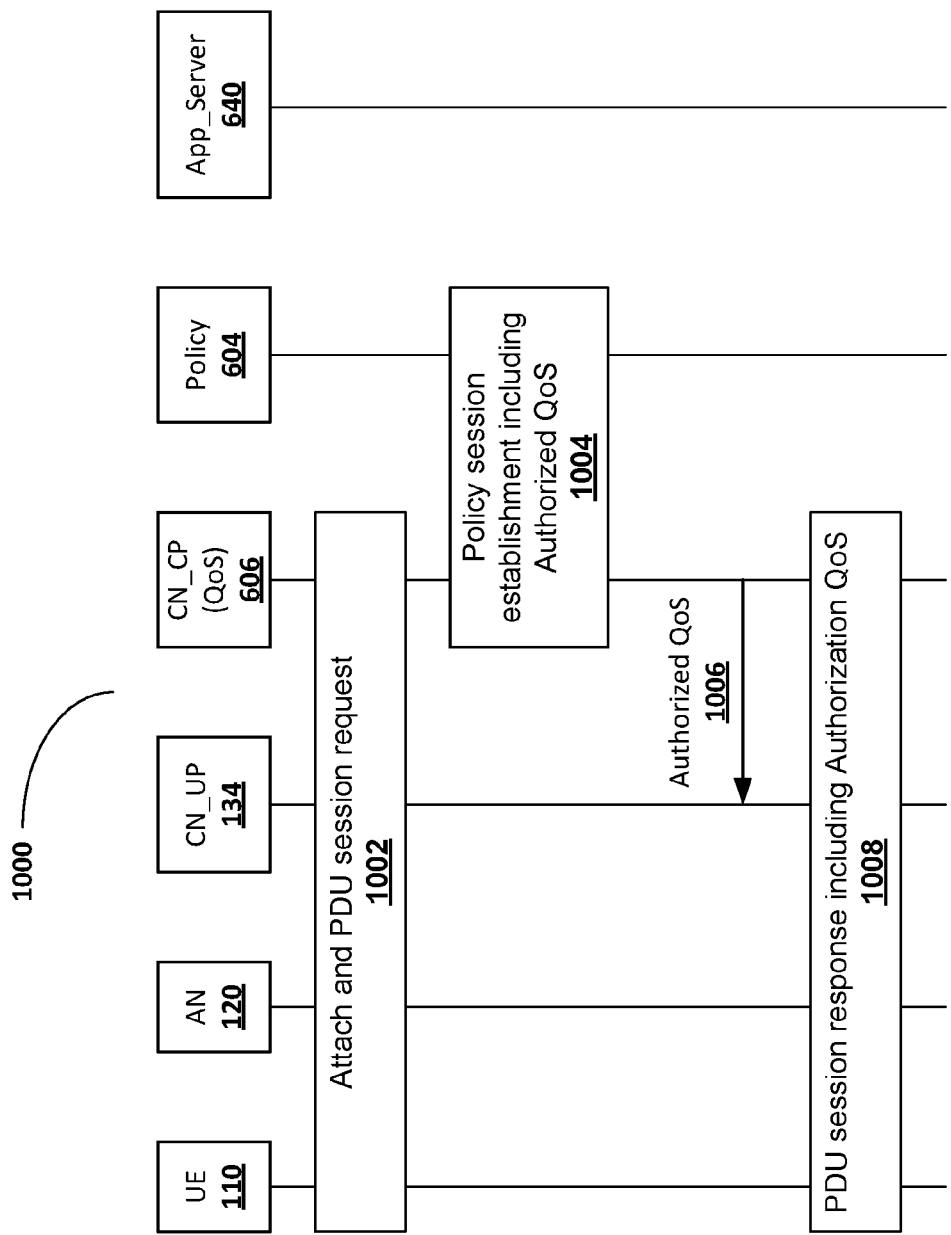
FIG. 10 is a message call flow diagram illustrating an example of a process for an authorization of a PDU session QoS, in accordance with embodiments of the present invention.

During a PDU session establishment, the QoS for a generic treatment of service data flows in the network is decided and associated to a non-Service-specific PDU flow. FIG. 10 is a message call flow diagram illustrating an example of a process for an authorization of a PDU session QoS 1000, in accordance with embodiments of the present invention. The process 1000 may follow the below sequence:

Step 1002: The UE attach to the network and a PDU session between the UE and a data network is requested. The PDU session carries all traffic related to PDU connectivity service regardless of the characteristics of individual Service Data flows.

Step 1004: If deployed, the CN_CP (QOS) establish a session towards the Policy function and invoke to authorization of the PDU session including the Authorized QoS of the PDU session for PDU flow to be used for a generic treatment of service data flows in the network. Alternatively, the CN_CP (QOS) 606 may authorize the PDU session including the Authorized QoS of the PDU session for the PDU flow to be used for a generic treatment of service flows in the network based on local policies.

Step 1006: The CN_CP (QOS) 606 may forward the Authorised QoS to CN_UP 134. The CN_UP 134 may acknowledge the reception.

Step 1008: The CN_CP (QOS) 606 may complete the PDU session establishment and inform the network functions about the Authorized QoS of the PDU session to be enforced.

Figure 11:
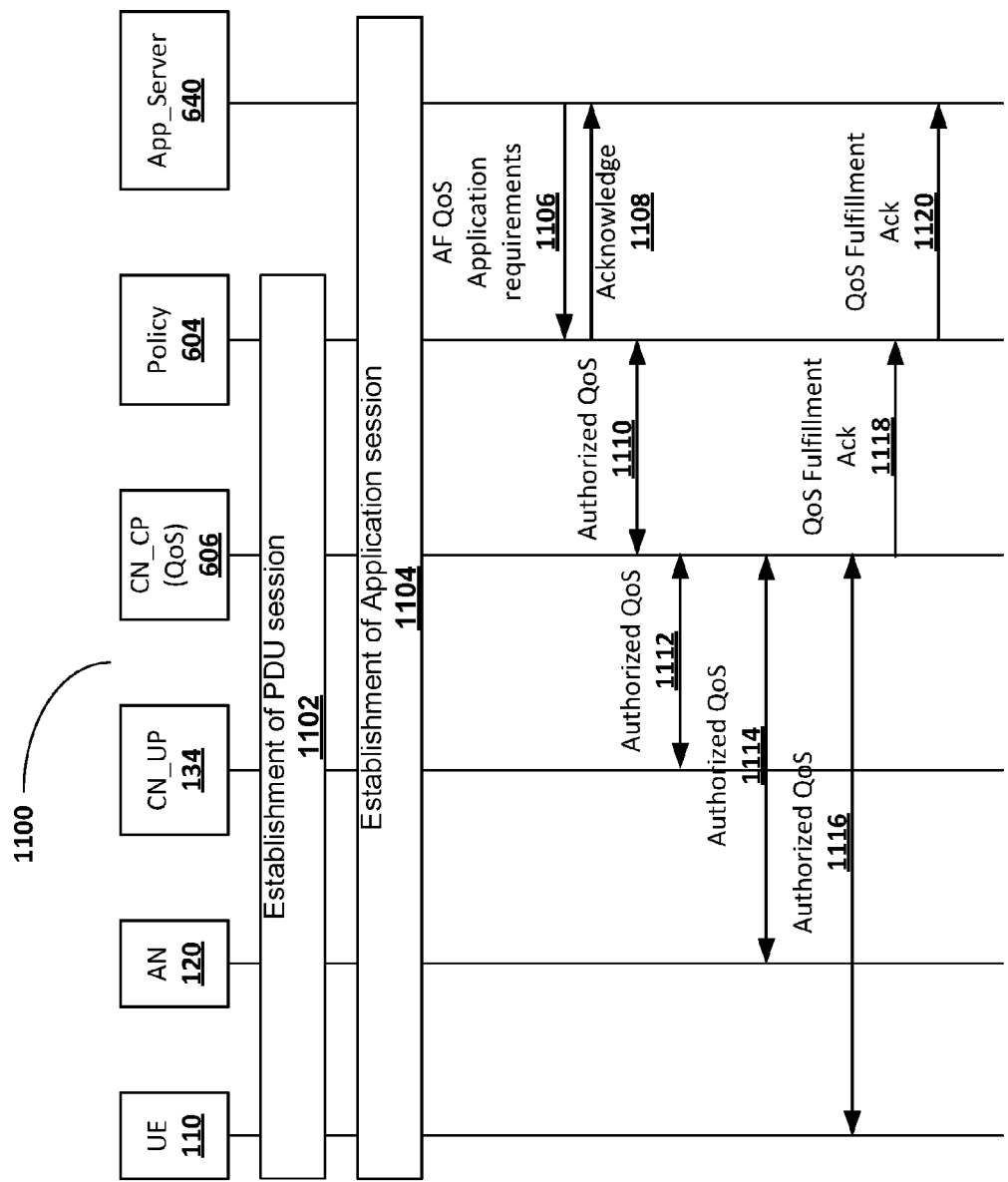
FIG. 11 is a message call flow diagram illustrating another example of a process for an authorization of a data flow QoS, in accordance with embodiments of the present invention.

Service data flows or PDU data flows associated with an application in an application server may require a specific treatment in the network. If so, the Policy Function may authorize a QoS per SDF to be associated to a PDU flow, and enforced by the network. FIG. 11 is a message call flow diagram illustrating another example of a process for an authorization flow QoS 1100, in accordance with embodiments of the present invention. The process 1100 may have the following sequence:

Step 1102: A PDU session is established between the UE and a data network 140. The PDU session carries all traffic related to PDU connectivity service regardless of the characteristics of individual Service Data flows. The Policy function may be invoked to authorize the QoS characteristics of the PDU session as described above.

Step 1104: An Application Session consisting of one or multiple service data flows is established between the UE and the Application Server.

Step 1106: The App_Server (Service Layer) indicates the application QoS requirements as well as the necessary information to classify the application's service data flow(s). The request from the App_Server may be originating from the App_Server or from the UE through Service Layer communication.

Step 1108: Based on the operator policies, the Policy Function 604 authorizes the QoS that the network will enforce on the application's service data flow(s) and acknowledge the Application layer.

Step 1110: The Policy Function 604 sends the Authorised QoS per service data flow to CN_CP (QOS), as well as the necessary information to classify the application's service data flow(s). The Authorised QoS per service data flow represent the treatment that the network shall apply to the flow.

Step 1112: The CN_CP (QOS) process the Authorised QoS per service data flow and forward the Authorised QoS per PDU flow to CN_UP as well as the Authorized QoS per service data flow. The CN_UP acknowledge the reception.

Step 1114: The CN_CP (QOS) forward the Authorised QoS to AN per PDU flow. The AN acknowledges the reception and confirms that the Authorized QoS can be fulfilled to the CN CP. FFS if the Authorized QoS per SDF is forwarded to the AN. In the case of non-3GPP accesses, when lacking the capability of enforcing the QoS parameters on Radio Bearers, it is up to the access network to apply the Authorized QoS available in the access network.

Step 1116: The CN_CP (QoS) forward the Authorised QoS (TFT and filters, maximum bit rate) to the UE for classification and possible actions such as rate control. The UE acknowledge the reception.

Step 1118: The CN_CP (QOS) may confirm that the Authorized QoS can be fulfilled to the Policy Function 604.

Step 1120: The Policy Function 604 may confirm that the Authorized QoS can be fulfilled to the App_Server.

A person skilled in the art would appreciate that the teachings of the present invention may be applied to signaling procedures, such as the "PDU Session Establishment" procedure or the "PDU Session Modification" procedure, of 3GPP TS 23.502, titled "Procedures for the 5G System", Version 0.3.0 published in April 2017 or other versions.

Figure 12:
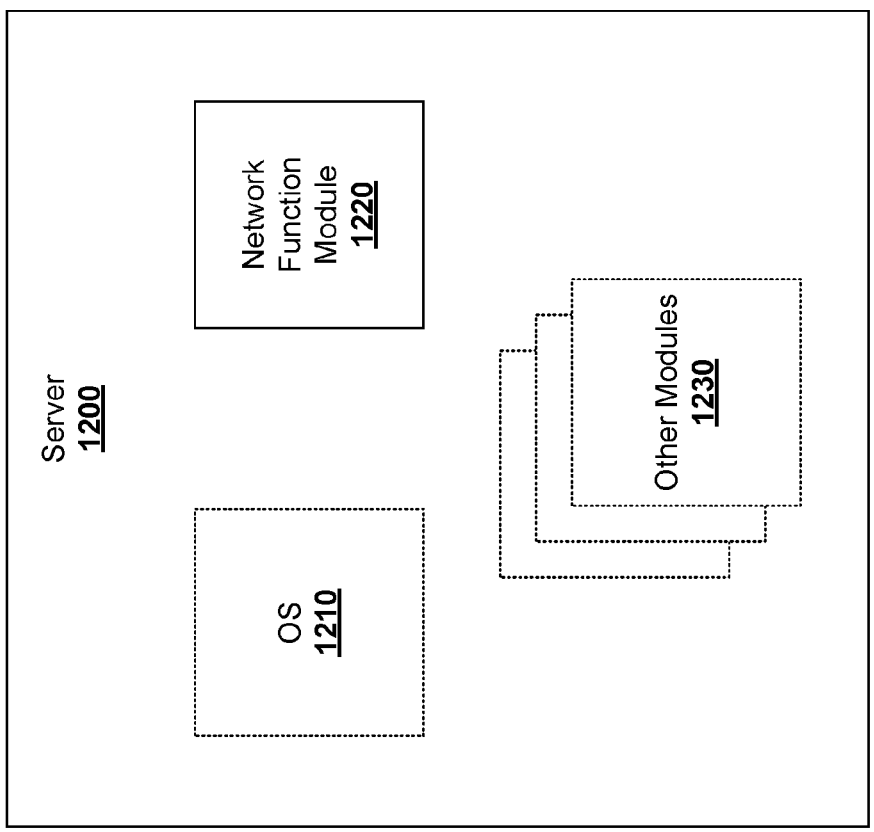
FIG. 12 illustrates, in a block diagram, an example of a server, that implements the methods and procedures as described herein.

FIG. 12 illustrates, in a block diagram, an example of a server 1200, that implements the methods and procedures as described above. The server 1200 comprises an operating system 1210, a network function module 1220, and other modules 1230 used by the server 1200 for other purposes. Optionally, the server 1200 may also include a hypervisor (not shown) above the operating system 1210. Portions of the method and procedures described above may be implemented as code in a hardware or software component of an ED 110 (e.g. UE), an eNodeB or eNodeG of a (R)AN 120, or a network function of a CN 130.

Figure 13:
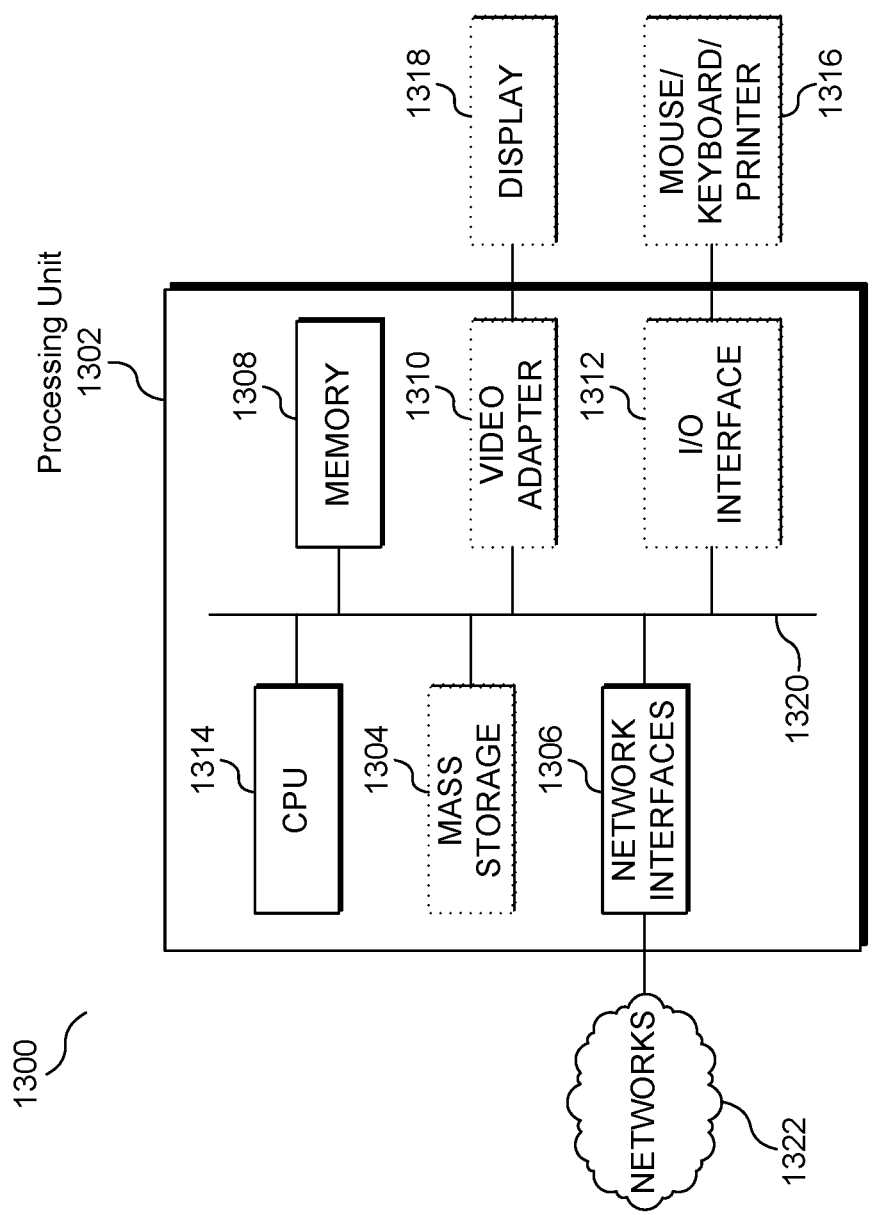
FIG. 13 illustrates, in a block diagram, a computing system that may be used for implementing some of the devices and methods disclosed herein.

FIG. 13 illustrates, in a block diagram, a computing system 1300 that may be used for implementing some of the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit 1302 includes a central processing unit (CPU) 1314, memory 1308, one or more network interfaces 1306, and may optionally further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. The memory 1308 may include ROM for use at boot-up, and DRAM for program and data storage for use while executing programs.

The one or more network interfaces 1306 may comprise wired links, such as an Ethernet cable, and/or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. The processing unit 1302 may be coupled to a network 1322 (i.e., a local-area network or a wide-area network) for data processing and communications with remote devices, such as other processing units, the Internet, or remote storage facilities.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and one or more I/O devices 1316 (i.e., mouse/keyboard/printer) coupled to the I/O interface 1312. Other devices may be coupled to the processing unit 1302, and additional or fewer interface cards may be utilized. For example, a serial interface such as universal serial bus (USB) (not shown) may be used to provide an interface for an external device.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method, for execution at a policy enforcement and reporting function in a network, comprising:
   receiving, from a traffic monitor, traffic parameters associated with a packet data unit (PDU) data flow carrying real-time traffic, the traffic parameters representative of measurements taken during a short-term measurement window and measurements taken during a long-term measurement window, the short-term measurement window and the long-term measurement window being differently sized; and transmitting signaling comprising a traffic shaping policy, associated with the PDU data flow, in accordance with the traffic parameters associated with the short-term measurement window and the long-term measurement window, for enforcement at a user plane function in the network.

2. The method of claim 1, wherein the traffic monitor is associated with a network function in the user plane of the network.

3. The method of claim 1, wherein the real-time traffic is video traffic.

4. The method of claim 1, wherein the traffic parameters comprise at least one of a maximum bit rate, a minimum bit rate, an average bit rate, a peak rate and a peak rate duration, associated with at least one of the short-term measurement window and the long-term measurement window.

5. The method of claim 1, wherein the short-term measurement window and the long-term measurement window are fixed in size.

6. The method of claim 5, wherein traffic parameters associated with the short-term measurement window are non-instantaneous traffic parameters.

7. The method of claim 1, wherein the traffic shaping policy shapes the PDU data flow such that an average bit rate associated with the short-term window is not higher than a maximum bit rate associated with the PDU data flow.

8. The method of claim 1, wherein the traffic shaping policy shapes the PDU data flow such that a minimum resource reservation for the PDU data flow in the network is ensured.

9. The method of claim 1, further including transmitting signaling towards a user plane function to monitor traffic parameters of the PDU data flow over the short-term measurement window and the long-term measurement window.

10. The method of claim 1, wherein the traffic shaping policy comprises instructions to apply traffic shaping to the PDU data flow.

11. The method of claim 1, further comprising transmitting signaling to report a network event associated with the PDU data flow, in accordance with the traffic parameters associated with the short-term measurement window and the long-term measurement window.

12. The method of claim 11, wherein the network event comprises at least one of:
an average bit rate associated with the PDU data flow within the short term measurement window is higher than a maximum bit rate associated with the PDU data flow;
a buffer overflow associated with the PDU data flow;
a packet loss rate associated with the PDU data flow caused by a buffer overflow exceeds a threshold; and
an average bit rate associated with the PDU data flow in the long term measurement window is below a minimum bit rate associated with the PDU data flow.

13. A network function comprising:
a network interface for receiving and transmitting data to a network;
a processor; and
a non-transitory memory storing instructions that when executed by the processor configure the network function to:
receive, from a traffic monitor, traffic parameters associated with a packet data unit (PDU) data flow carrying real-time traffic, the traffic parameters representative of measurements taken during a short-term measurement window and measurements taken during a long-term measurement window, the short-term measurement window and the long-term measurement window being differently sized; and
transmit signaling comprising a traffic shaping policy, associated with the PDU data flow, in accordance with the traffic parameters associated with the short-term measurement window and the long-term measurement window, for enforcement at a user plane function in the network.

14. The network function of claim 13, wherein the traffic monitor is associated with a network function in the user plane of the network.

15. The network function of claim 13, wherein the real-time traffic is video traffic.

16. The network function of claim 13, wherein the traffic parameters comprise at least one of a maximum bit rate, a minimum bit rate, an average bit rate, a peak rate, and a peak rate duration, associated with at least one of the short-term measurement window and the long-term measurement window.

17. The network function of claim 13, wherein the short-term measurement window and the long-term measurement window are fixed in size.

18. The network function of claim 17, wherein traffic parameters associated with the short-term measurement window are non-instantaneous traffic parameters.

19. The network function of claim 13, wherein the traffic shaping policy shapes the PDU data flow such that an average bit rate associated with the short-term window is not higher than a maximum bit rate associated with the PDU data flow.

20. The network function of claim 13, wherein the traffic shaping policy shapes the PDU data flow such that a minimum resource reservation for the PDU data flow in the network is ensured.

21. The network function of claim 13, further configured to transmit signaling towards a user plane function to monitor traffic parameters of the PDU data flow over the short-term measurement window and the long-term measurement window.

22. The network function of claim 13, wherein the traffic shaping policy comprises instructions to apply traffic shaping to the PDU data flow.

23. The network function of claim 13, further configured to transmit signaling to report a network event associated with the PDU data flow, in accordance with the traffic parameters associated with the short-term measurement window and the long-term measurement window.

24. The network function of claim 23, wherein the network event comprises at least one of:
an average bit rate associated with the PDU data flow within the short term measurement window is higher than a maximum bit rate associated with the PDU data flow;
a buffer overflow associated with the PDU data flow;
a packet loss rate associated with the PDU data flow caused by a buffer overflow exceeds a threshold; and
an average bit rate associated with the PDU data flow in the long term measurement window is below a minimum bit rate associated with the PDU data flow.

25. A user equipment comprising:
a radio access network interface for receiving and transmitting data to a network;
a processor; and a non-transitory memory storing instructions that when executed by the processor configure the user equipment to:
receive, from a traffic monitor, traffic parameters associated with a packet data unit (PDU) data flow carrying real-time traffic, the traffic parameters representative of measurements taken during a short-term measurement window and measurements taken during a long-term measurement window, the short-term measurement window and the long-term measurement window being differently sized;
change encoding parameters associated with the PDU data flow in accordance with the traffic parameters associated with the short-term measurement window and the long-term measurement window; and
transmit the PDUs in the PDU data flow encoded in accordance with the changed encoding parameters.

* * * * *